United States Patent [19]
Sekita

[11] Patent Number: 5,973,858
[45] Date of Patent: *Oct. 26, 1999

[54] REFLECTING OPTICAL SYSTEM AND OPTICAL APPARATUS

[75] Inventor: Makoto Sekita, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/789,801

[22] Filed: Jan. 28, 1997

[30] Foreign Application Priority Data

Jan. 29, 1996 [JP] Japan .................................. 8-034320

[51] Int. Cl.⁶ .......................... G02B 17/00; G02B 27/14
[52] U.S. Cl. ........................ 359/729; 359/364; 359/633; 359/727
[58] Field of Search ................................... 359/364–367, 359/708, 720, 726–732, 744, 850–861, 630–633

[56] References Cited

U.S. PATENT DOCUMENTS

| | | | |
|---|---|---|---|
| 3,152,209 | 10/1964 | Cox et al. | 88/57 |
| 3,674,334 | 7/1972 | Offner | 350/55 |
| 4,775,217 | 10/1988 | Ellis | 350/538 |
| 5,042,928 | 8/1991 | Richards | 359/727 |
| 5,063,586 | 11/1991 | Jewell et al. | 378/34 |
| 5,093,567 | 3/1992 | Staveley | 250/221 |
| 5,485,305 | 1/1996 | Johnson | 359/364 |
| 5,600,492 | 2/1997 | Tanaka et al. | 359/708 |
| 5,638,219 | 6/1997 | Puerta et al. | 359/729 |
| 5,699,194 | 12/1997 | Takahashi | 359/633 |

FOREIGN PATENT DOCUMENTS

| | | |
|---|---|---|
| 59-204817 | 11/1984 | Japan . |
| 2-297516 | 12/1990 | Japan . |
| 7-104209 | 4/1995 | Japan . |
| 7-333551 | 12/1995 | Japan . |
| 8-050256 | 2/1996 | Japan . |
| 8-179223 | 7/1996 | Japan . |
| 8-179238 | 7/1996 | Japan . |
| 8-234136 | 9/1996 | Japan . |
| 8-234137 | 9/1996 | Japan . |

*Primary Examiner*—Thong Nguyen
*Attorney, Agent, or Firm*—Fitzpatrick, Cella, Harper & Scinto

[57] ABSTRACT

The present invention relates to a reflecting optical system, wherein the reflecting optical system comprises a first reflecting surface having a positive power and a second reflecting surface having a negative power, wherein at least one of the surfaces is inclined and the reflecting optical system comprises a substantially afocal optical system of the surfaces.

53 Claims, 15 Drawing Sheets

REFLECTING OPTICAL SYSTEM AND OPTICAL APPARATUS

BACKGROUND OF THE INVENTION

1. Field of the Invention

The present invention relates to a reflecting optical system and, more particularly, to a reflecting optical system constituting an afocal optical system.

2. Related Background Art

An example of the conventional optical system parts of which are comprised of reflecting surfaces is the telescope as illustrated in FIG. 1. This telescope is of a type called Cassegrain reflecting telescope, which is composed of a concave mirror 151, a convex mirror 152, and an eyepiece lens 155. This telescope is constructed in such an arrangement that the concave mirror 151 reflects parallel light 154 from an object at infinity into a converging beam on the object side, the convex mirror 152 disposed on the object side of the concave mirror 151 reflects the beam toward an observer to form an object image on an intermediate image plane 153, and then the object image is observed using the eyepiece lens 155 disposed behind the intermediate image plane 153.

In this way, the Cassegrain reflecting telescope has the optical system the total length of which is shortened by folding an optical path of a telephoto lens system with a long total length of lens comprised of refracting lenses by the two opposed reflecting mirrors.

Further, the above-stated telescope is arranged to receive a nearly parallel incident beam from the object at infinity and to emit a nearly parallel beam. The optical system of this type is normally called as an afocal optical system, which is used mainly in an observation optical system such as a viewfinder of telescope or camera.

In addition to the example of the afocal optical system having the imaging point in the optical system as in the above-stated telescope, there are afocal optical systems having no imaging point of real image in the optical system.

For example, Japanese Laid-open Patent Application No. 59-204817, U.S. Pat. No. 3,152,209, or the like discloses a wide converter lens, which is an example of the afocal optical system having no imaging point of real image in the optical system.

The simplest arrangement of the afocal optical system having no imaging point in the optical system is a so-called inverted Galilean telescope comprised of a combination of a negative lens with a positive lens as shown in FIG. 2.

In FIG. 2, reference numeral 163 designates a negative lens the focal length of which is $-f_0$ ($f_0$ is positive), and 164 a positive lens the focal length $f_E$ of which is $f_E = f_0 + e$. Here, e is a distance between the negative lens 163 and the positive lens 164.

The action of this optical system is next described. A parallel beam 161 from the object at infinity is first incident to the negative lens 163 disposed nearest to the object to be refracted by the negative lens 163, thereby forming a virtual image of the object at point A $f_0$ apart from the negative lens 163 on the object side.

Then the beam refracted by the negative lens 163 is incident to the positive lens 164. Since the object point A at that time is coincident with the position of the front focal point of the positive lens 164, the positive lens 164 focuses the image at infinity. Accordingly, this optical system is an afocal optical system 162 arranged to receive the parallel beam incident thereto from the object at infinity and to emit the parallel beam and having no imaging point of real image in the optical system.

At this time, the angular magnification $\gamma$ of the afocal optical system 162 can be obtained as a ratio of absolute values of the focal lengths of the negative lens 163 and positive lens 164, i.e., $\gamma = f_0/f_E$. The ratio $\gamma$ in this case is smaller than 1.

The afocal optical system can change the angular magnification of optical system while emitting the parallel beam from the incident parallel beam in this way. Therefore, by locating the afocal optical system in front of an imaging optical system, the image magnification (focal length) of the imaging optical system can be changed without changing the position of the image plane of the imaging optical system alone.

FIG. 3 is an optical layout drawing in which the afocal optical system shown in FIG. 2 is disposed in front of the imaging optical system. In FIG. 3, the afocal optical system 162 of FIG. 2 is located in front of the imaging optical system 171 with the focal length $f_M$, whereby the combined focal length $f_A$ becomes one obtained by multiplying the focal length $f_M$ of the imaging optical system 171 by the angular magnification $\gamma$ of the afocal optical system 162. That is, $f_A = \gamma \cdot f_M$. In the case of FIG. 3, $f_A$ is smaller than $f_M$ and therefore, the afocal optical system 162 becomes a wide converter.

The telescope of FIG. 2 has the negative lens 163 disposed on the object side and the positive lens 164 disposed behind thereof, but another example may be of an arrangement of so-called Galilean telescope in which the positive lens is disposed on the object side and the negative lens is disposed behind thereof. Since in this case $\gamma$ is greater than 1, the telescope has a function of tele-converter.

Although the Cassegrain reflecting telescope has the shortened total length as compared with the case of the optical systems composed of only the refracting optical system, it is arranged to once form the object image and locate the eyepiece lens behind it, and therefore, the Cassegrain reflecting telescope has the relatively long total length among the afocal systems.

In contrast with it, the afocal optical systems having no imaging point of real image can be constructed with short total lengths like the inverted Galilean telescope or the Galilean telescope as described above.

Such afocal optical systems having no imaging point of real image in the optical system are used as converter lens systems such as the so-called wide converter or tele-converter in such a way that the afocal optical system of a desired magnification is mounted on the object side of the imaging optical system as shown in FIG. 3 to change the focal length of the imaging optical system by the magnification of afocal optical system, or used in cameras or the like as a finder optical system such as an Albada finder.

The afocal optical systems of this type, however, need at least two lens systems and normally have to include two or more lenses in order to further improve the performance and specifications.

In addition, most of the conventional afocal optical systems were composed of rotationally symmetric refracting lenses and reflecting surfaces, which imposed restriction on the degrees of freedom of arrangement of optical components in optical apparatus.

This situation will be described referring to FIG. 4A and FIG. 4B. FIG. 4A and FIG. 4B are explanatory drawings where a converter lens composed of conventional lenses rotationally symmetric is mounted on a camera. FIG. 4A is a front view thereof and FIG. 4B is a side view thereof.

In FIG. 4A and FIG. 4B, the converter lens 183 is mounted in front of the imaging optical system (master lens) 182 of camera 181.

In general, the so-called front converter lens mounted in front of the imaging optical system 182 is easy in correction for aberration of converter lens but on the other hand, the lens size thereof tends to be extremely greater than that of the imaging optical system. As a result, since the converter lens 183 with a large outer diameter was mounted to the camera 181, there occurred some cases that the converter lens covered a part of the optical path of another optical system built in the camera 181, for example, such as a finder system 184 or a photometry optical system 185.

There were some other cases in which the converter lens 183 did not cover another optical component directly but interrupted a part of optical path 191 of another optical system, for example, of the finder system 184, as shown in FIG. 4B.

SUMMARY OF THE INVENTION

An object of the present invention is to provide a reflecting optical system that is compact and high in optical performance and that has high degrees of freedom of arrangement of optically acting surfaces so as not to eclipse a beam of another optical system, for example, when used as mounted to another optical apparatus.

In order to achieve the above object, a reflecting optical system of the present invention is characterized by comprising:

a front group having a predetermined power;

a rear group having a power opposite to the predetermined power the front group has;

wherein the reflecting optical system has at least one reflecting surface inclined to an object surface and the front group and the rear group construct a substantially afocal optical system.

In one aspect of the present invention the reflecting optical system is characterized by further comprising:

a first refracting surface; and a second refracting surface, wherein the reflecting optical system is a solid optical system.

In the reflecting optical system of the present invention, at least one of the foregoing surfaces preferably comprises a rotationally asymmetric surface. In this case, the rotationally asymmetric surface is shaped so as to effect correction for rotationally asymmetric aberration occurring in light passing the reflecting optical system.

The reflecting optical system of the present invention can be suitably applied to converters such as wide converters or tele-converters used as attached to optical apparatus such as cameras, or to finder optical systems built in the optical apparatus.

When the reflecting optical system of the present invention is used as a tele-converter, it is preferred that absolute values of powers of the first refracting surface and the second refracting surface be substantially equal to each other and signs thereof be different from each other.

DETAILED DESCRIPTION OF THE PREFERRED EMBODIMENTS

Described before description of embodiments are the way of expressing specifications of arrangement of embodiments and common matters to the whole embodiments.

Figure 5:
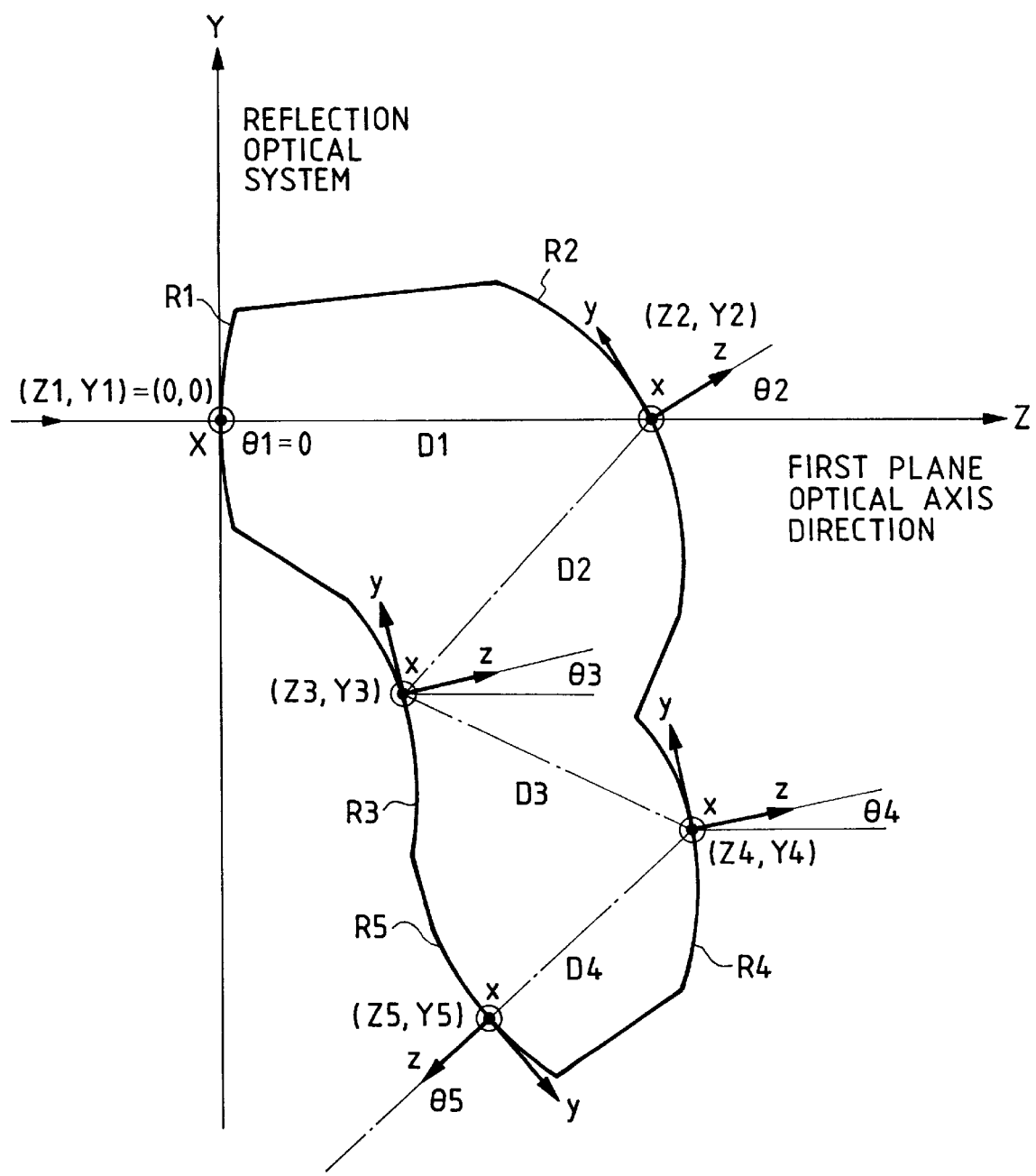
FIG. 5 is an explanatory drawing of the coordinate system in embodiments of the present invention.

FIG. 5 is an explanatory drawing of the coordinate system for defining constituent data of optical system of the present invention. In the embodiments of the present invention the i-th surface defines the i-th surface along a ray (which is indicated by a chain line in FIG. 5 and which will be called as a reference axis ray) traveling from the object side to the image plane or to the observation plane.

In FIG. 5 the first surface R1 is a refracting surface, the second surface R2 is a reflecting surface tilted relative to the first surface R1, the third surface R3 and fourth surface R4 are reflecting surfaces shifted and tilted relative to each preceding surface, and the fifth surface R5 is a refracting surface shifted and tilted relative to the fourth surface R4, and these refracting surfaces and reflecting surfaces compose a reflecting optical system.

Since the optical system of the present invention is a decentering optical system, the surfaces composing the optical system have no common optical axis. Hence, in the embodiments of the present invention, an absolute coordinate system is first set with the origin at the center of the ray effective diameter of the first surface.

Then, in the present embodiment, the center point of the ray effective diameter of the first surface is defined as the origin and a path of the ray passing the origin and the center of the image plane or the observation plane (the reference axis ray) is defined as "reference axis" of the optical system. Further, the positive direction of the reference axis in the present embodiment is taken along the traveling direction of the reference axis ray.

The reference axis being the reference of optical system was set as described above in the present embodiment, but the axis for the reference of optical system may be determined along any axis that is convenient for optical designing, for handling of aberration, or for expressing a configuration of each surface constituting the optical system.

However, the reference axis being the reference of optical system is normally set along a path of a ray passing the center of the image plane or the observation plane and either one of the aperture, the entrance pupil, the exit pupil, and the center of the first surface or the center of the final surface of optical system.

In other words, in the present embodiment, the reference axis is set along the path in which the ray passing the center point of the ray effective diameter of the first surface and traveling to the center of the final image plane or observation plane (the reference axis ray) is refracted and reflected by the respective refracting surfaces and reflecting surfaces. The order of each surface is determined according to the order of passage of the reference axis ray traveling to the image plane as refracted and reflected.

Accordingly, the reference axis changes its direction in accordance with the rule of refraction or reflection in the order of each surface thus set and then finally reaches the center of the image plane or the observation plane.

Further, a path of the reference axis ray incident to each surface will be called as "incident reference axis" of that surface and a path of the reference axis ray emerging after refracted or reflected by each surface as "emergent reference axis" of that surface. Similarly, the reference axis ray incident to each surface will be called as "incident reference axis ray", and the reference axis ray emerging from each surface as "emergent reference axis ray".

All tilt surfaces constituting the optical system of each embodiment of the present invention are basically tilted in a same plane. Thus, the axes of the absolute coordinate system are determined as follows.

Z-axis: the reference axis passing the origin and going to the second surface R2

Y-axis: a straight line passing the origin and making 90° counterclockwise relative to the Z-axis in the tilt plane (or in the plane of FIG. 5)

X-axis: a straight line passing the origin and being perpendicular to the Z-axis and Y-axis (a straight line normal to the plane of FIG. 5)

In order to express a surface configuration of the i-th surface constituting the optical system, a way of expressing the surface configuration of that surface by a local coordinate system with the origin at an intersecting point between the reference axis and the i-th surface is better for understanding in recognizing the configuration rather than the way of expressing the configuration of that surface by the absolute coordinate system. Therefore, the surface configuration of the i-th surface will be expressed by a local coordinate system in numerical embodiments for indicating component data of the present invention.

A tilt angle in the YZ plane of the i-th surface will be expressed by an angle $\theta_i$ (°), which is positive in the counterclockwise direction (or in the direction making an angle of elevation), relative to the Z-axis of the absolute coordinate system. Therefore, the origin of the local coordinate system of each surface resides on the YZ plane in FIG. 5 in the numerical embodiments of the present invention.

There is no decentration of surface in the XZ plane and in the XY plane. Further, the y-axis and z-axis of the local coordinate system (x, y, z) of the i-th surface are inclined at angle $\theta_i$ in the YZ plane relative to the absolute coordinate system (X, Y, Z), and specifically, the axes are determined as follows.

z-axis: a straight line passing the origin of the local coordinate system and making an angle $\theta_i$ counterclockwise in the YZ plane relative to the Z-direction of the absolute coordinate system y-axis: a straight line passing the origin of the local coordinate system and making 90° counterclockwise in the YZ plane relative to the z-direction x-axis: a straight line passing the origin of the local coordinate system and being perpendicular to the YZ plane $D_i$ is a scalar quantity indicating a distance between the origins of the local coordinate systems of the i-th surface and the (i+1)-th surface, and $N_{di}$ and $\nu_{di}$ are refractive index and Abbe number of a medium between the i-th surface and the (i+1)-th surface. In the numerical embodiments each of the aperture and the exit pupil is indicated as one plane.

The optical systems of the embodiments have spherical surfaces and rotationally asymmetric, aspherical surfaces. For the spherical surfaces among them, the radius of curvature will be denoted by $r_i$. The sign of the radius of curvature $r_i$ is minus when the center of curvature is on the first surface side along the reference axis (the chain line in FIG. 5) going from the first surface to the image plane or the observation plane, while it is plus when the center of curvature is on the image plane side.

A spherical surface has a shape expressed by the following equation:

$$z = \{(x^2+y^2)/r_i\}/[1+\{1-(x^2+y^2)/r_i^2\}^{1/2}].$$

An optical system of the present invention has at least one aspherical surface rotationally asymmetric, and the shape thereof is expressed by the following equation:

$$z = A/B + C_{02}y^2 + C_{11}xy + C_{20}x^2 + C_{03}y^3 + C_{12}xy^2 +$$
$$C_{21}x^2y + C_{04}y^4 + C_{13}xy^3 + C_{22}x^2y^2 + C_{31}x^3y + C_{40}x^4 + \ldots$$

where $A = (a+b) \cdot (y^2 \cdot \cos^2 t + x^2)$ $B = 2a \cdot b \cdot \cos t [1 + \{(b-a) \cdot y \cdot \sin t / (2a \cdot b)\} +$
$[1 + \{(b-a) \cdot y \cdot \sin t / (a \cdot b)\} - \{y^2/(a \cdot b)\} -$
$\{4a \cdot b \cdot \cos^2 t + (a+b)^2 \sin^2 t\}x^2 / (4a^2b^2 \cdot \cos^2 t)]^{1/2}].$ Each rotationally asymmetric surface in the embodiments has a shape plane-symmetric with respect to the symmetry plane of the yz plane, which is expressed using only the even-order terms and the odd-order terms of 0 as to x in the above equation. If the following conditions are satisfied, a surface will have a shape symmetric with respect to the xz plane.

$$C_{03}=C_{21}=t=0$$

Further, if the following conditions are satisfied, a surface will have a rotationally symmetric shape.

$$C_{02}=C_{20} \text{ and } C_{04}=C_{40}=C_{22}/2$$

If the above conditions are not satisfied, a surface will have a shape being not rotationally symmetric.

The power $\phi$ of each rotationally asymmetric surface in the present invention will be calculated by (Eq. 1).

Here, N is an index of refraction on the entrance side, N' an index of refraction on the exit side, $\theta$ an angle of incidence of the incident reference axis ray, and $\theta'$ an angle of emergence of the emergent reference axis ray, and these satisfy the law of refraction:

$$N \sin \theta = N' \sin \theta' \quad \text{(Eq. 2)}.$$

Further, $\xi$ is an azimuth, which is defined to be $\xi=0$ for the refracting surface of the reference axis, but which is defined to be $\xi=0$ for the yz plane in the present invention. In addition, $\xi'$ is an ideal azimuth in an aberrationfree state, and $\xi=\xi'$ may be assumed on calculation of power.

Since in the present invention the odd-order terms are 0, (Eq. 1) can be transformed to (Eq. 3).

Further, since $N'=-N$ and $\theta'=-\theta$ for reflecting surfaces, (Eq. 3) can be modified into (Eq. 4).

angle $u_X$. The horizontal half view angle $u_Y$ is a maximum half view angle of a beam incident to the first surface R1 in the YZ plane of FIG. 5 and the vertical half view angle $u_X$ is a maximum half view angle of the beam incident to the first surface R1 in the XZ plane.

In a photographing optical system a stop aperture diameter is indicated as a quantity representing brightness of optical system, and in an observation optical system an aperture of the exit pupil in the observation plane is indicated as a pupil diameter.

Further, in a photographing optical system an effective image region on the image plane is indicated as an image size. The image size is represented by a rectangular region having a horizontal size in the y-direction of local coordinate system and a vertical size in the x-direction.

Further, the angular magnification of optical system is shown in an observation optical system and in a converter lens system.

In addition, a transverse aberration diagram is shown for each numerical embodiment with constituent data. The transverse aberration diagram includes transverse aberration diagrams of beam at angles of incidence in combinations of horizontal incident angle and vertical incident angle being $(u_Y, u_X)$, $(0, u_X)$, $(-u_Y, u_X)$, $(u_Y, 0)$, $(0, 0)$, and $(-u_Y, 0)$.

In the transverse aberration diagrams the abscissa represents the height of incidence to the pupil and the ordinate an aberration quantity. Since each embodiment is arranged so that each surface basically has a plane-symmetric shape with respect to the symmetry plane of the yz plane, each transverse aberration diagram is also equal in the plus direction and in the minus direction. Therefore, the transverse aberration diagrams in the minus direction are omitted for simplicity of illustration.

On each aberration diagram a solid line indicates aberration at the d-line and a dotted line aberration at the g-line.

Figure 6:
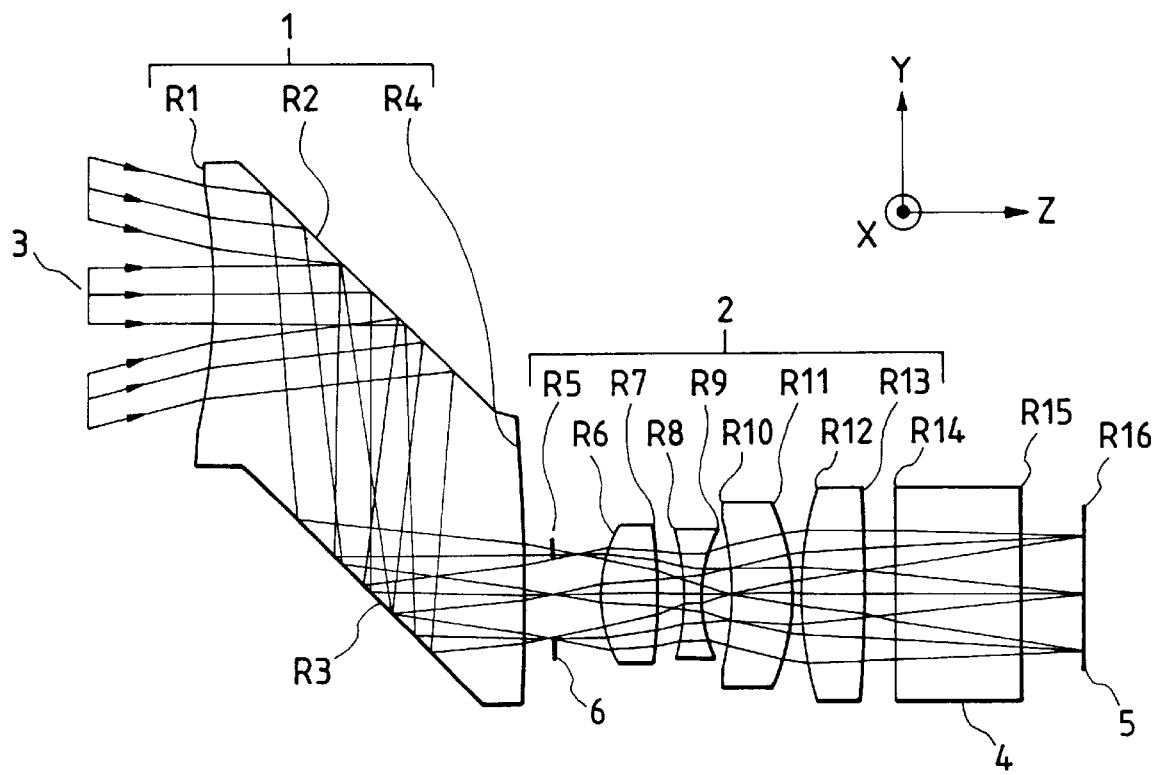
FIG. 6 is a cross-sectional view and optical path diagram where a reflecting optical system (of Embodiment 1) is mounted to a master lens.

FIG. 6 is a cross-sectional view and optical path diagram of an embodiment in which the reflecting optical system of the present invention is mounted as a converter lens to a master lens of an optical apparatus such as a camera (Embodiment 1). In the drawing, reference numeral 1 designates a wide converter, which is comprised of the reflecting optical system of the present invention. Numeral 2 denotes the master lens of the optical apparatus. Numeral 3 designates the reference axis of the optical system, 4 a correction filter such as an infrared cut filter or a phase plate, and 5 the image plane.

The wide converter 1 of the present embodiment is disposed on the object side of the master lens 2, and is composed of a first refracting surface R1 having a negative power, a convex mirror R2 being a first reflecting surface having a negative power, a concave mirror R3 being a second reflecting surface having a positive power, and a $$\phi = \frac{2(N'\cos\theta' - N\cos\theta)\{\cos\xi'\cos\xi C_{02} + (\cos\theta'\sin\xi'\cos\xi + \cos\theta\cos\xi'\sin\xi)C_{11} + \cos\theta\cos\theta'\sin\xi'\sin\xi C_{20}\}}{\sqrt{\cos\theta\cos\theta'(\cos\theta'\cos\xi'\cos\xi + \cos\theta\sin\xi'\sin\xi)(\cos\theta'\xi'\sin\xi + \cos\theta\cos\xi'\cos\xi)}} \quad \text{(Eq. 1)}$$

$$\phi = \frac{2(N'\cos\theta' - N\cos\theta)(\cos^2\xi C_{02} + \cos\theta\cos\theta'\sin^2\xi C_{20})}{\sqrt{\cos\theta\cos\theta'(\cos\theta'\cos^2\xi + \cos\theta\sin^2\xi)(\cos\theta'\sin^2\xi + \cos\theta\cos^2\xi)}} \quad \text{(Eq. 3)}$$

$$\phi = \frac{-4(\cos^2\xi C_{02} + \cos^2\theta\sin^2\xi C_{20})}{\cos\theta}$$

In each numerical embodiment of the present invention, a photographing field or an observation field will be expressed by a horizontal half view angle $u_Y$ and a vertical half view angle $u_X$.

second refracting surface R4 having a positive power, which are formed in order from the object side on a transparent body. Accordingly, the wide converter of the present embodiment is arranged so that the first refracting surface R1 and first reflecting surface R2 constitute a front group having a negative power while the second reflecting surface R3 and second refracting surface R4 constitute a rear group having a positive power. The two reflecting surfaces both are inclined relative to the reference axis and are curved reflecting surfaces.

The optical action of the wide converter 1 in the present embodiment will be described. The beam from the object is first incident to the first refracting surface R1 and the object beam becomes diverging by the negative refractive power of the first refracting surface R1 to enter the convex mirror R2.

The convex mirror R2 makes the object beam further divergent by the negative power of the convex mirror R2 and also reflects the object beam in the negative direction of the Y-axis in FIG. 6 in order to make the object beam incident to the concave mirror R3.

Then the concave mirror R3 relaxes angles of divergence of the object beam by the positive power of the concave mirror R3 and also reflects the object beam in the positive direction of the Z-axis so as to make the emergent reference axis parallel to the incident reference axis.

The object beam reflected by the concave mirror R3 is changed to nearly parallel light by the positive power of the second refracting surface R4 and the nearly parallel light is emergent from the wide converter 1.

Next, in the master lens 2 located behind the wide converter 1, the quantity of light is restricted by an aperture stop 6 disposed at the object-side extreme and then the beam is subject to refraction by a refracting lens system of four-unit and four-lens arrangement. Then the beam passes through the correction filter 4 to form an object image on the image plane 5.

As described, the wide converter 1 emits the parallel beam from the incident parallel beam and, at the same time, performs angular magnification conversion of about ×0.7, and the position of the image plane 5 of the master lens 2 is constant irrespective of attachment or detachment of the wide converter 1.

In the present embodiment the incident reference axis is parallel to the emergent reference axis and directions thereof are the same. Accordingly, when the present embodiment is mounted to a camera, the photographing direction is the same as the viewing direction of the camera finder.

In the present embodiment the wide converter for performing magnification conversion by a single component is formed by integrally molding the two refracting surfaces and two reflecting surfaces in surfaces of a transparent body, for example, an optical glass or a colorless transparent plastic, and therefore, it can realize reduction of number of components and reduction of costs as compared with the conventional converters using plural refracting lenses.

In the present embodiment the reflecting surfaces are rotationally asymmetric surfaces, thereby effecting correction for asymmetric aberration occurring because the inclined reflecting surfaces have power.

Further, the present embodiment is arranged so that not only the reflecting surfaces but also the refracting surfaces are rotationally asymmetric surfaces whereby decentration aberration is not corrected only by the reflecting surfaces but the refracting surfaces also contribute to correction for decentration aberration, thus effecting well-balanced correction for decentration aberration and improving the optical performance.

In the present embodiment the number of reflecting surfaces is even and no image inversion occurs because no real image is formed in the wide converter 1. Thus, the present embodiment is effective in constructing a thin wide converter.

Figure 7:
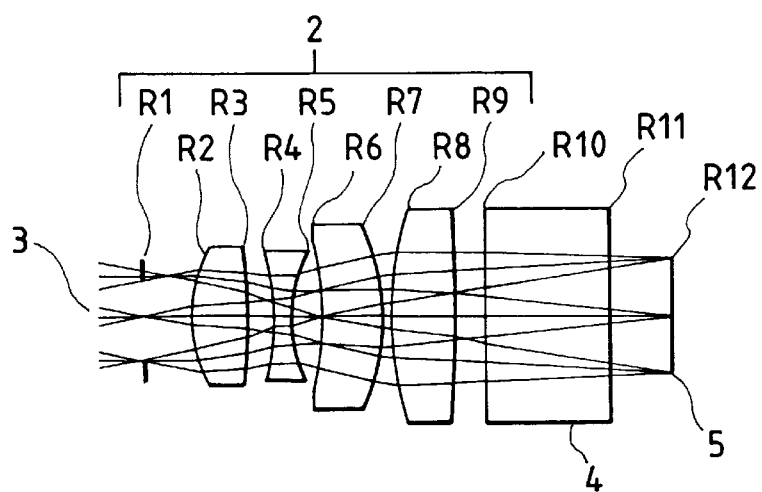
FIG. 7 is a cross-sectional view and optical path diagram of the master lens.

FIG. 7 is a cross-sectional view and optical path diagram of only the master lens 2.

Figure 8A:
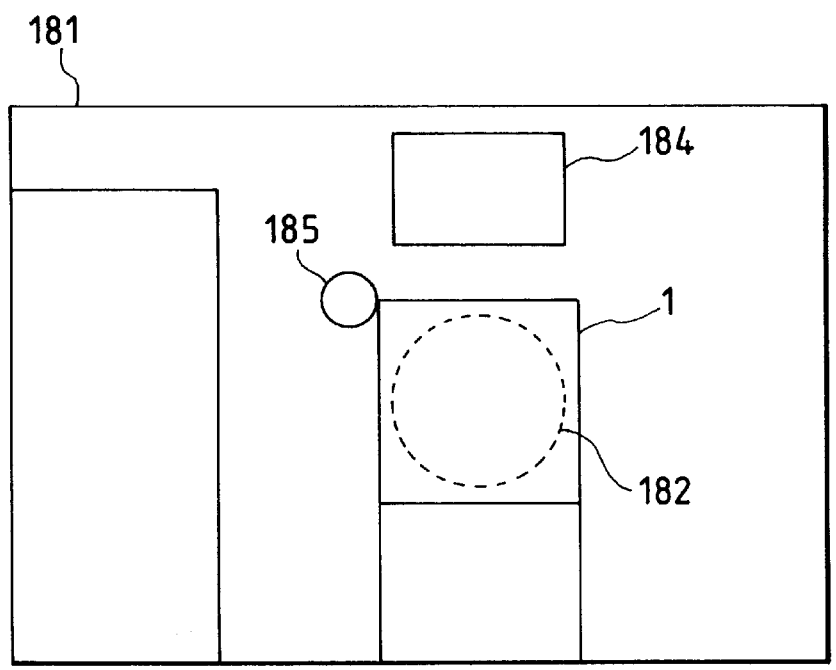
FIGS. 8A and 8B are explanatory drawings where a converter lens based on the present invention is mounted to a camera.
Figure 8B:
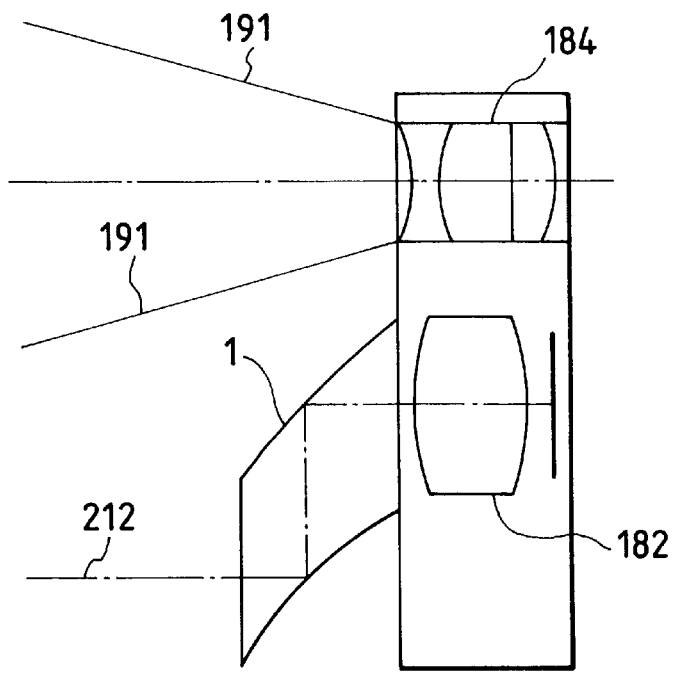

Next described referring to FIG. 8A and FIG. 8B is the effect achieved when the wide converter lens of the present embodiment is mounted to the camera. FIG. 8A and FIG. 8B are explanatory drawings where the present embodiment is mounted to the camera. FIG. 8A is a front view and FIG. 8B is a side view.

Figure 1:
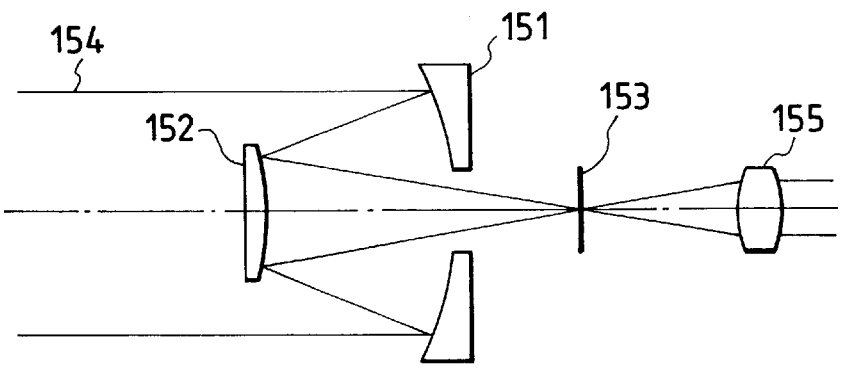
FIG. 1 is an explanatory drawing of the conventional reflecting telescope.
Figure 2:
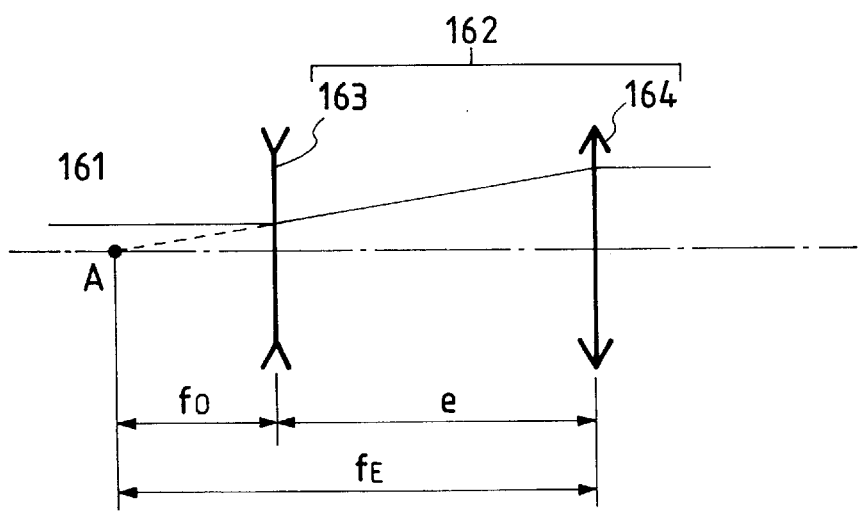
FIG. 2 is an explanatory drawing of the afocal system.
Figure 3:
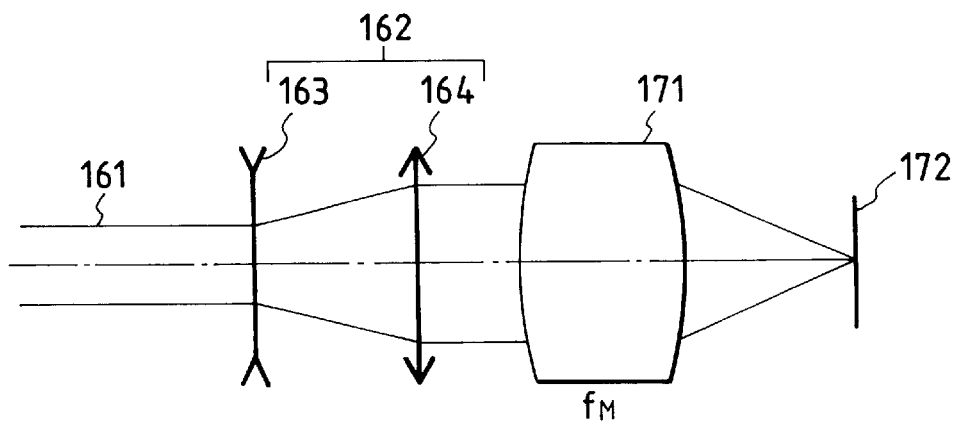
FIG. 3 is an explanatory drawing of the converter lens.
Figure 4A:
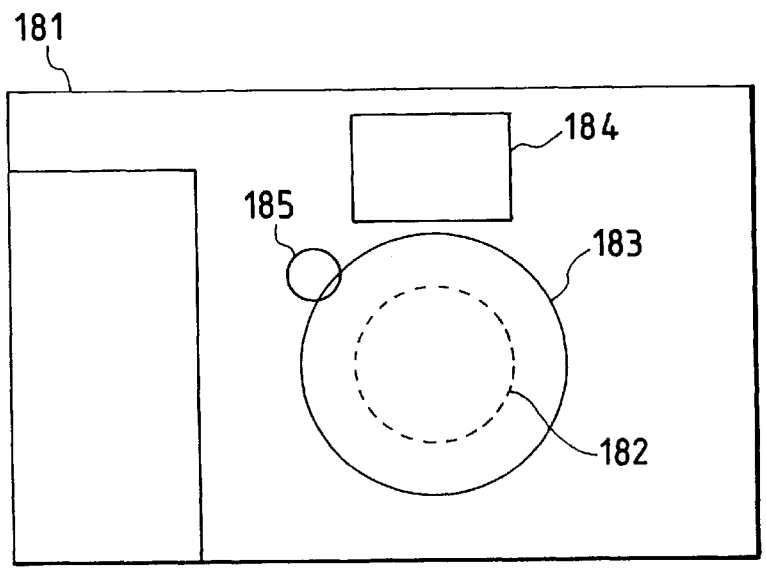
FIGS. 4A and 4B are explanatory drawings where the conventional converter lens is mounted to a camera.
Figure 4B:
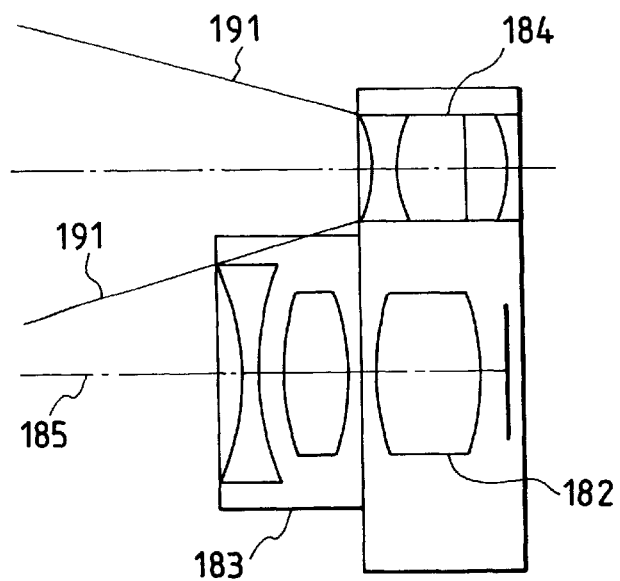

In FIG. 8A and FIG. 8B the same reference numerals as those in FIG. 4A and FIG. 4B indicate the same components. In FIG. 8A and FIG. 8B, the wide converter 1 of the present embodiment is mounted in front of the imaging optical system (master lens) 182 of camera 181, similarly as in the case of the conventional converter lens 183 of FIG. 4A and FIG. 4B.

In the case of the conventional converter lens 183 shown in FIG. 4A and FIG. 4B, because it is composed of the rotationally symmetric refracting lenses, the optical axis of the converter lens must be made coincident with the optical axis 185 of the imaging optical system 182, and the position thereof cannot be moved even in the cases where the converter lens interrupts an optical path of another optical component.

However, since the wide converter 1 of the present embodiment is arranged as capable of bending the optical path freely using the reflecting surfaces, the position of the entrance surface of the wide converter 1 can be set freely. Accordingly, the wide converter 1 is constructed so as not to be an obstacle, taking the optical paths of the other optical systems into consideration.

For example, in FIG. 8A and FIG. 8B, the incident reference axis 212 is shifted downward of the camera 181 relative to the optical axis of the imaging optical system 182. Therefore, the converter 1 can be located without interrupting the optical path 191 of the finder system 184 and without covering the optical path of the photometry optical system 185.

Additionally, the compact converter can be realized because each optically acting surface of the converter 1 is made as a rotationally asymmetric surface so as to effect good correction for aberration.

In FIG. 8A and FIG. 8B the incident reference axis is shifted downward relative to the center axis of the imaging optical system 182, but the direction of shift of the incident reference axis is not limited to the downward direction. The incident reference axis may be freely set to be shifted upward, to the left, or to the right, depending upon the form of camera or another optical apparatus.

Figure 9:
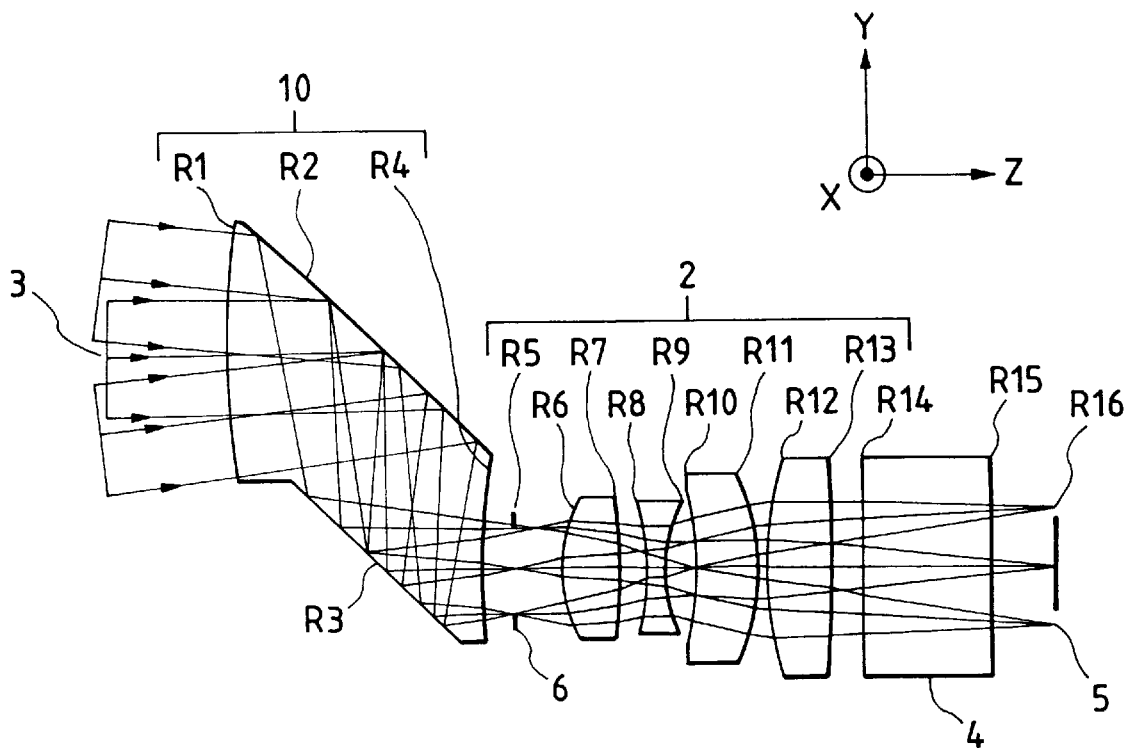
FIG. 9 is a cross-sectional view and optical path diagram where a reflecting optical system (of Embodiment 2) is mounted to the master lens.

FIG. 9 is a cross-sectional view and optical path diagram of another embodiment in which the reflecting optical system of the present invention is mounted as a converter lens to the master lens of optical apparatus (Embodiment 2). In the drawing reference numeral 10 designates a tele-converter, which is the reflecting optical system of the present invention. Numeral 2 denotes the master lens which is the same as in the embodiment shown in FIG. 6. Numeral 3 is the reference axis of optical system, 4 the correction filter such as the infrared cut filter or the phase plate, and 5 the image plane.

The tele-converter 10 of the present embodiment is disposed on the object side of the master lens 2, and is comprised of a first refracting surface R1 having a positive power, a concave mirror R2 being a first reflecting surface having a positive power, a convex mirror R3 being a second reflecting surface having a negative power, and a second refracting surface R4 having a negative power, which are formed in order from the object side on a transparent body.

Accordingly, the tele-converter 10 of the present embodiment is arranged so that the first refracting surface R1 and first reflecting surface R2 constitute a front group having a positive power while the second reflecting surface R3 and second refracting surface R4 constitute a rear group having a negative power. The two reflecting surfaces both are inclined relative to the reference axis and are curved reflecting surfaces.

The optical action of the tele-converter 10 in the present embodiment will be described. The beam from the object is first incident to the first refracting surface R1, and the object beam is incident to the concave mirror R2 as being converged by the positive refractive power of the first refracting surface R1.

The concave mirror R2 further converges the object beam by the positive power of the concave mirror R2 and also reflects the object beam in the negative direction of the Y-axis in FIG. 9 in order to make the beam incident to the convex mirror R3.

Then the convex mirror R3 relaxes angles of convergence of the object beam by the negative power of the convex mirror R3 and also reflects the object beam in the positive direction of the Z-axis so as to make the emergent reference axis parallel to the incident reference axis.

The object beam reflected by the convex mirror R3 is converted to nearly parallel light by the negative power of the second refractive power R4 and the nearly parallel light is emergent from the tele-converter 10.

The master lens 2 located behind the tele-converter 10 then restricts the quantity of light by the aperture stop 6 located at the object-side extreme, and then the beam is subject to refraction by the refracting lens system of four-unit and four-lens arrangement. Then the beam passes through the correction filter 4 to form an object image on the image plane 5.

As described, the tele-converter 10 emits the parallel beam as converted from the incident parallel beam and, at the same time, performs angular magnification conversion of about 1.4, and the position of the image plane 5 of the master lens 2 is constant irrespective of attachment or detachment of the tele-converter 10.

In the present embodiment the incident reference axis and emergent reference axis are parallel to each other and directions thereof are the same. Accordingly, when the present embodiment is mounted to a camera, the photographing direction is the same as the viewing direction of the camera finder.

In the present embodiment, chromatic aberration to occur at the refracting surfaces is prevented as follows.

In general, angles of reflection are constant independent of the wavelengths at a reflecting surface so as to cause no chromatic aberration, but angles of refraction differ depending upon the wavelengths at a refracting surface so as to cause chromatic aberration.

Normally, a refracting system is corrected for chromatic aberration occurring in each lens, using a plurality of lenses with different dispersion, but use of the plural lenses increases the cost.

Thus, the present embodiment is arranged so that signs of powers of the two refracting surfaces are different from each other and so that absolute values of the powers are nearly equal to each other. This makes the combined power of the refracting surfaces low, thereby preventing occurrence of chromatic aberration of tele-converter 10.

Also in the present embodiment, similarly as in Embodiment 1, the tele-converter is constructed of a single transparent body to effect magnification conversion by a single component, which can realize reduction of number of components and reduction of cost as compared with the conventional converter lenses using plural refracting lenses.

Also in the present embodiment, the reflecting surfaces and refracting surfaces are rotationally asymmetric surfaces, thereby effecting well-balanced correction for decentration aberration and thus improving the optical performance.

In addition, the present embodiment is arranged so that the number of reflecting surfaces is even and so that no image inversion occurs because no real image is formed in the tele-converter 10, and therefore, it is a thin tele-converter lens.

Figure 10:
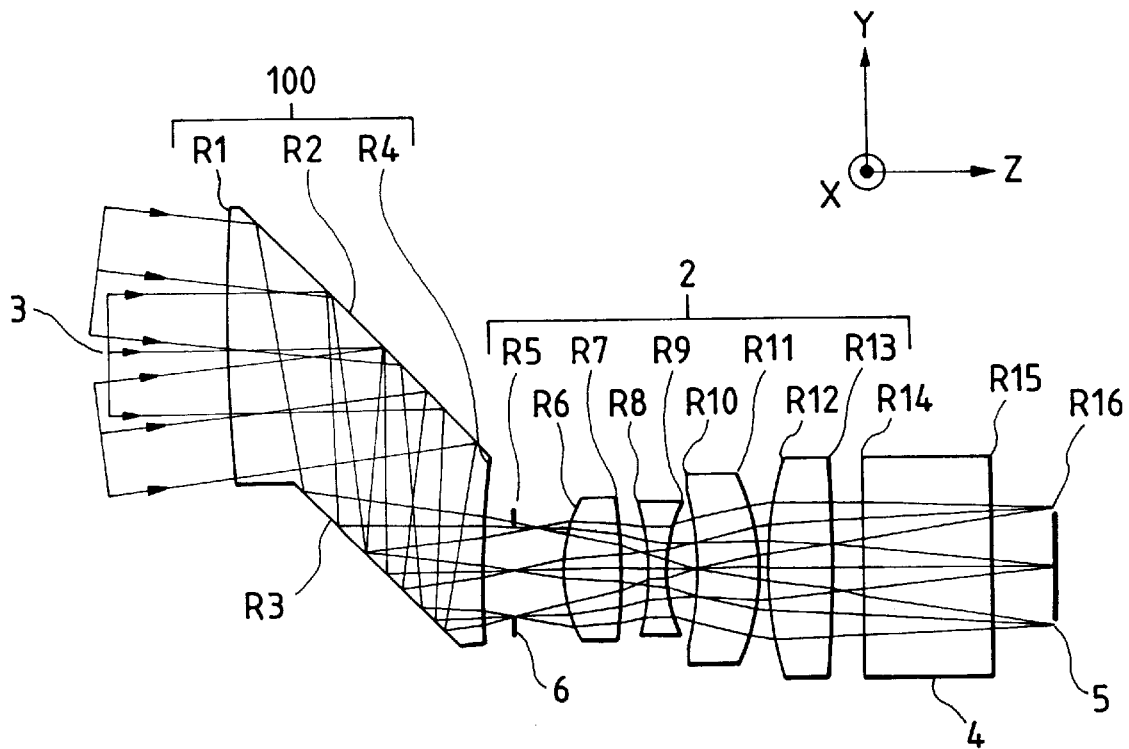
FIG. 10 is a cross-sectional view and optical path diagram where a reflecting optical system (of Embodiment 3) is mounted to the master lens.

FIG. 10 is a cross-sectional view and optical path diagram of Embodiment 3 of the present invention. In the drawing, reference numeral 100 designates an afocal element having different magnifications in two directions perpendicular to the reference axis, which is the reflecting optical system of the present invention. Numeral 2 denotes the master lens, which is the same as in Embodiment 1 shown in FIG. 6. Numeral 3 is the reference axis of optical system, 4 the correction filter such as the infrared cut filter or the phase plate, and 5 the image plane.

The afocal element 100 of the present embodiment is disposed on the object side of the master lens 2 and is comprised of a first refracting surface R1 having a positive power, a concave mirror R2 being a first reflecting surface having a positive power, a convex mirror R3 being a second reflecting surface having a negative power, and a second refracting surface R4 having a negative power, which are formed in order from the object side on a transparent body. Accordingly, the afocal element 100 of the present embodiment is arranged so that the first refracting surface R1 and first reflecting surface R2 constitute a front group having a positive power while the second reflecting surface R3 and second refracting surface R4 constitute a rear group having a negative power. The two reflecting surfaces both are inclined relative to the reference axis and are curved reflecting surfaces.

The optical action of the afocal element 100 in the present embodiment will be described. The beam from the object is first incident to the first refracting surface R1 and the object beam is incident to the concave mirror R2 as converged by the positive refractive power of the first refracting surface R1.

The concave mirror R2 further converges the object beam by the positive power of the concave mirror R2 and also reflects the object beam in the negative direction of the Y-axis in FIG. 10 in order to make the beam incident to the convex mirror R3.

Then the convex mirror R3 relaxes angles of convergence of the object beam by the negative power of the convex mirror R3 and also reflects the object beam in the positive direction of the Z-axis so as to make it parallel to the incident reference axis.

The object beam reflected by the convex mirror R3 is converted to nearly parallel light by the negative power of the second reflecting surface R4 and the nearly parallel light is emergent from the afocal element 100.

In the master lens 2 located behind the afocal element 100, the aperture stop 6 disposed at the object-side extreme next regulates the quantity of light and then the beam is subject to refraction by the refracting lens system of four-unit and four-lens arrangement. Then the beam passes through the correction filter 4 to form an object image on the image plane 5.

Then the present embodiment is arranged to emit the parallel beam as converted from the parallel beam incident to the afocal element 100 and to perform magnification conversion at different angular magnifications in two directions perpendicular to the reference axis and perpendicular to each other at that time. Specifically, the shape of each surface is determined so as to perform the angular magnification conversion of ×1.3 in the ZY plane in FIG. 10 and to perform the angular magnification conversion of ×1.2 in the ZX plane.

This is realized by constructing the afocal element 100 in such a manner that each optically acting surface of the afocal element 100 is formed as a rotationally asymmetric surface, the power of each surface in the Y-axis direction is different from that in the X-axis direction, and a power arrangement of each surface is properly set in the two orthogonal directions, whereby the incident parallel beam is emitted in the form of a parallel beam in any direction while having the different magnifications in the two directions.

When such an afocal system having the different magnifications in the two directions perpendicular to the reference axis and perpendicular to each other is mounted to a camera, conversion of aspect of the object image can be effected readily.

In the present embodiment the incident reference axis is parallel to the emergent reference axis and directions thereof are the same. Accordingly, when the present embodiment is mounted to the camera, the photographing direction is the same as the viewing direction of the camera finder.

Since the present embodiment is also arranged to perform magnification conversion by one component comprised of the afocal element made of a transparent body similarly as in Embodiment 1, the present embodiment can also realize reduction of number of components and reduction of cost, as compared with the conventional afocal lenses using plural refracting lenses.

Further, the present embodiment is also arranged so that the reflecting surfaces and refracting surfaces are rotationally asymmetric surfaces, thereby effecting well-balanced correction for decentration aberration and thus improving the optical performance.

Since in the present embodiment the number of reflecting surfaces is even and since no image inversion occurs because no real image is formed in the afocal element 100, a thin afocal element can be constructed thereby.

Figure 11:
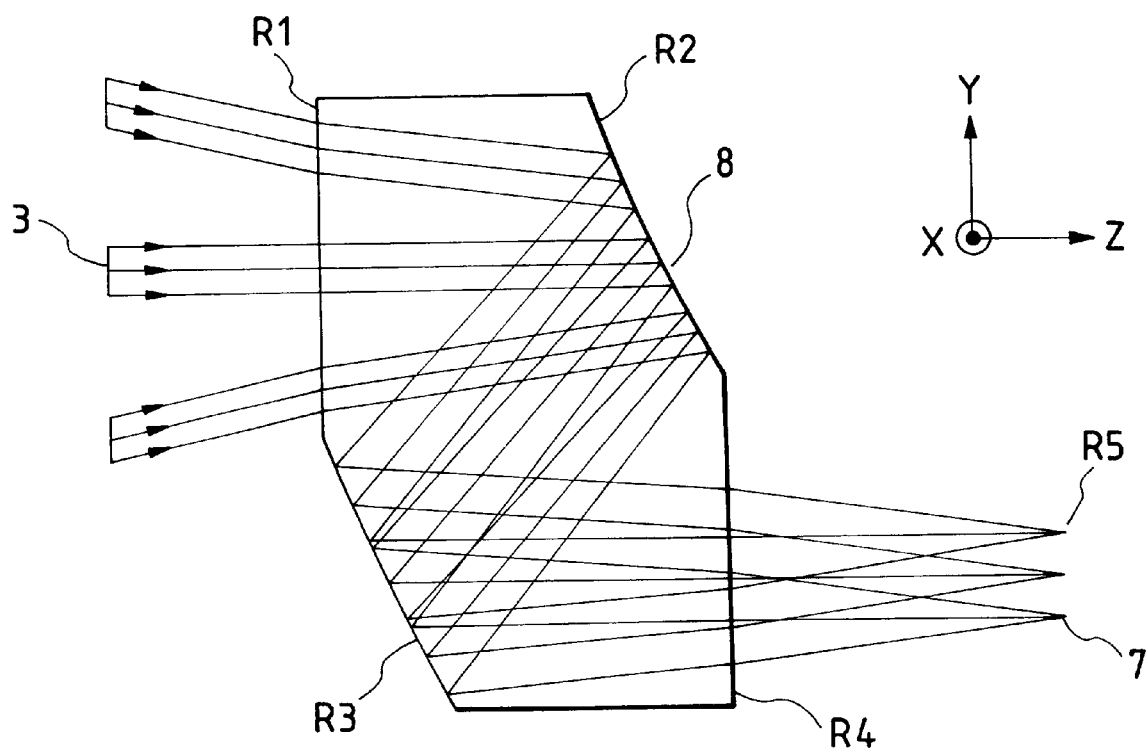
FIG. 11 is a cross-sectional view and optical path diagram of a reflecting optical system (of Embodiment 4)

FIG. 11 is a cross-sectional view and optical path diagram of Embodiment 4 of the reflecting optical system of the present invention. The present embodiment is a finder system.

In FIG. 11, reference numeral 8 designates a finder system of the present embodiment and is comprised of a first refracting surface R1 with the power of nearly 0, a convex mirror R2 being a first reflecting surface having a negative power, a concave mirror R3 being a second reflecting surface having a positive power, and a second refracting surface R4 with the power of nearly 0, which are formed in order from the object side on a transparent body. Accordingly, the finder system 8 of the present embodiment is arranged so that the first refracting surface R1 and first reflecting surface R2 constitute a front group having a negative power while the second reflecting surface R3 and second refracting surface R4 constitute a rear group having a positive power. The two reflecting surfaces both are inclined relative to the reference axis and are curved reflecting surfaces.

Numeral 7 denotes the exit pupil, and an observer observes the finder field with one's pupil here. Numeral 3 is the reference axis of the finder system 1.

The optical action of the finder system 8 in the present embodiment will be described. The beam from the object (a beam from the object at the distance 1 m in the present embodiment) is incident to the first refracting surface R1 and then is incident to the convex mirror R2. The convex mirror R2 diverges the object beam by the negative power of the convex mirror R2 and also reflects the object beam leftdownward on the plane of FIG. 11 in order to make the object beam incident to the concave mirror R3.

Then the concave mirror R3 relaxes angles of divergence of the object beam by the positive power of the concave mirror R3 and also reflects the object beam in the positive direction of the Z-axis so as to make the emergent reference axis parallel to the incident reference axis.

The object beam reflected by the concave mirror R3 passes through the second refracting surface R4 to become an observation beam of diopter −1 to be emitted from the finder system 8, and the object beam intersects at the exit pupil 7 a certain distance apart from the finder system 8, where the object image is observed.

The incident reference axis to the finder system 8 is parallel to the emergent reference axis from the finder system 8 and directions thereof are the same. Accordingly, the direction of observation with the finder is coincident with the photographing direction.

In Embodiment 4 the emergent reference axis is shifted horizontally relative to the incident reference axis. Therefore, when this finder system is used for a camera, for example, if the entrance plane of the finder is set immediately above the taking lens and if the exit plane of the finder is set as shifted to the right of the entrance plane when observed from the back of camera, there are effects that only vertical parallax occurs in the finder and that when the observer views into the finder as holding the camera, the feeling of use becomes better because the right eye is located slightly right relative to the camera.

Since Embodiment 4 is the finder which is thin in the Z-direction, it is advantageous in constructing a thin camera.

When the reflecting optical system of the present invention is applied to finders of camera as described above, it is advantageous in construction of camera.

Since in the present embodiment the finder system is constructed by integrally molding the two refracting surfaces and two reflecting surfaces in the surfaces of a transparent body, for example, an optical glass or a colorless transparent plastic, it can realize reduction of number of components and reduction of cost as compared with the conventional finder systems using plural refracting lenses.

Further, the present embodiment is also arranged so that the reflecting surfaces and refracting surfaces are rotationally asymmetric surfaces, thereby effecting well-balanced correction for decentration aberration and thus improving the optical performance.

In addition, the present embodiment is arranged so that the number of reflecting surfaces is even and so that no image inversion occurs because no real image is formed in the finder system 8, thereby forming the thin finder system.

Figure 12:
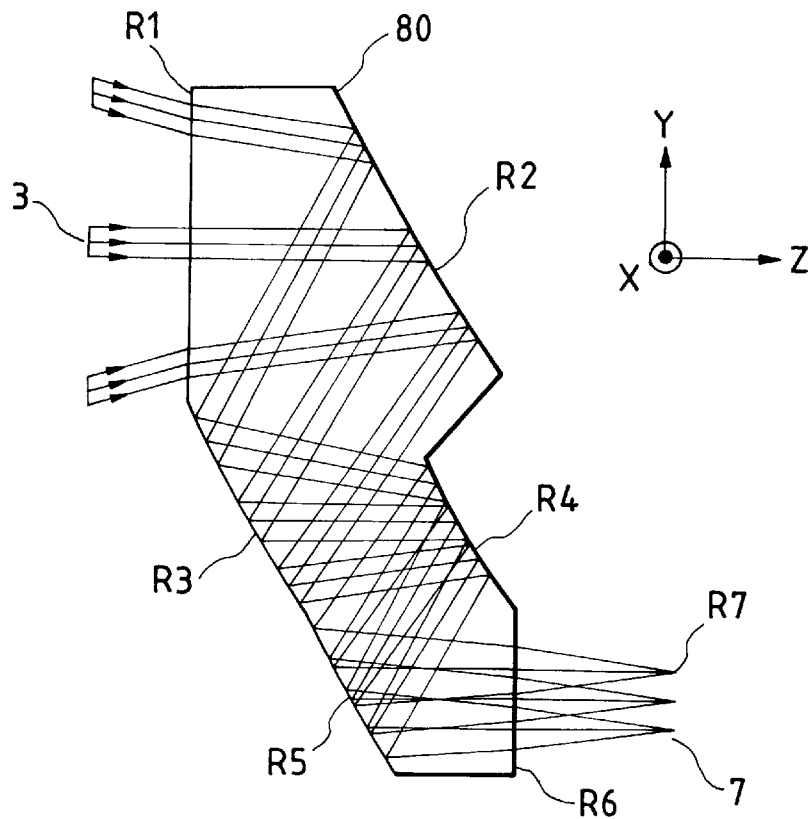
FIG. 12 is a cross-sectional view and optical path diagram of a reflecting optical system (of Embodiment 5)

FIG. 12 is a cross-sectional view and optical path diagram of Embodiment 5 of the reflecting optical system of the present invention. The present embodiment is a finder system, which is arranged to have two more reflecting surfaces than Embodiment 4 to enlarge the pupil diameter and to improve the optical performance.

In FIG. 12, reference numeral 80 designates a finder system of the present embodiment and is comprised of a first refracting surface R1 with the power of nearly 0, a convex mirror R2 being a first reflecting surface having a negative power, a concave mirror R3 being a second reflecting surface having a positive power, a convex mirror R4 being a third reflecting surface having a negative power, a concave mirror R5 being a fourth reflecting surface having a positive power, and a second refracting surface R6 with the power of nearly 0, which are formed in order from the object side on a transparent body. Accordingly, the finder system 80 of the present embodiment is arranged so that the first refracting surface R1 and the first to third reflecting surfaces R2 to R4 constitute a front group while the fourth reflecting surface R5 and second refracting surface R6 constitute a rear group. The four reflecting surfaces all are inclined relative to the reference axis and are curved reflecting surfaces.

Numeral 7 denotes the exit pupil, and the observer observes the finder field with the pupil here. Numeral 3 is the reference axis of the finder system 80.

The optical action of the finder system 80 in the present embodiment will be explained. The beam from the object (a beam from the object at the distance 1 m in the present embodiment) is incident to the first refracting surface R1 and thereafter is incident to the convex mirror R2.

The convex mirror R2 diverges the object beam by the negative power of the convex mirror R2 and also reflects the object beam left-downward on the plane of FIG. 12 in order to make the object beam incident to the concave mirror R3.

Then the concave mirror R3 converts the diverging object beam into a converging beam by the positive power of the concave mirror R3 and also reflects the object beam in the positive direction of the Z-axis in FIG. 12 in order to make the object beam incident to the convex mirror R4.

Then the convex mirror R4 converts the converging object beam into a diverging beam by the negative power of the convex mirror R4 and also reflects the object beam left-downward on the plane of FIG. 12 in order to make the object beam incident to the concave mirror R5.

Further, the concave mirror R5 relaxes angles of divergence of the object beam by the positive power of the concave mirror R5 and also reflects the object beam in the positive direction of the Z-axis so as to make the emergent reference axis parallel to the incident reference axis.

The object beam reflected by the concave mirror R5 passes through the second refracting surface R6 to become an observation beam of diopter −1 and to be emitted from the finder system 80, and the object beam intersects at the exit pupil 7 a certain distance apart from the finder system 80, where the object image is observed.

As described, the present embodiment is arranged to diverge and converge the object beam in the finder, thus achieving a bright finder with excellent optical performance.

The incident reference axis to the finder system 80 is parallel to the emergent reference axis from the finder system 80 and directions thereof are the same. Accordingly, the direction of observation with the finder is coincident with the photographing direction.

Advantageous points of the present embodiment for construction of camera are the same as in Embodiment 4.

Since the present embodiment is also arranged so that the finder is constructed by integrally molding the two refracting surfaces and four reflecting surfaces in the surfaces of a transparent body, for example, an optical glass or a colorless transparent plastic, it can realize reduction of number of components and reduction of cost as compared with the conventional finders using plural refracting lenses.

In addition, the present embodiment is also arranged so that the reflecting surfaces and refracting surfaces are rotationally asymmetric surfaces, thereby effecting well-balanced correction for decentration aberration and thus improving the optical performance.

Further, the present embodiment is arranged so that the number of reflecting surfaces is even and so that no image inversion occurs because no real image is formed in the finder system 80, thus achieving the thin finder system.

Figure 13:
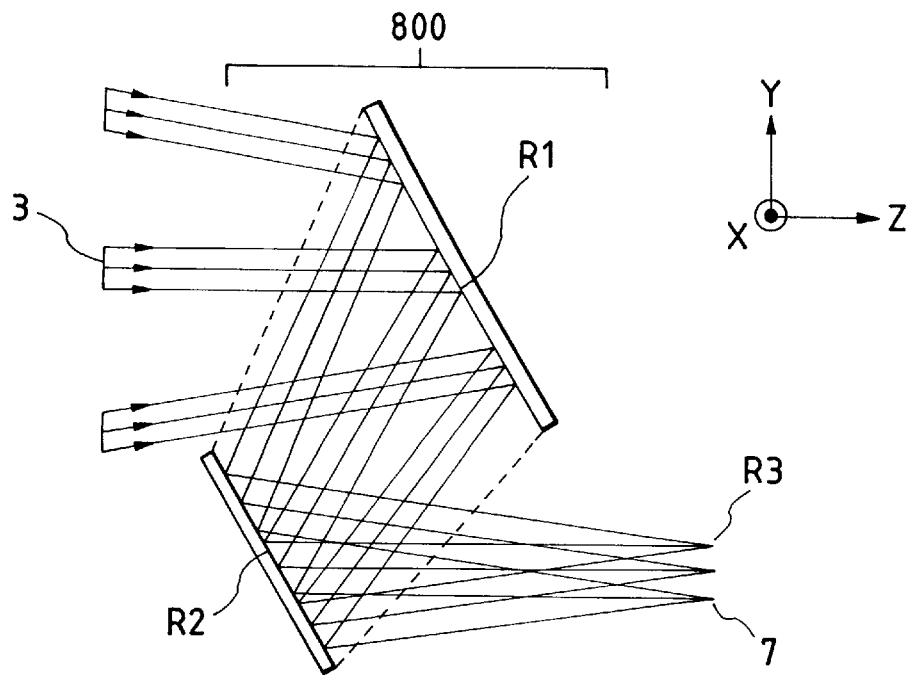
FIG. 13 is a cross-sectional view and optical path diagram of a reflecting optical system (of Embodiment 6)

FIG. 13 is a cross-sectional view and optical path diagram of Embodiment 6 of the reflecting optical system of the present invention. The present embodiment is a finder system. Embodiments 4 and 5 showed the finder systems in which the refracting surfaces and reflecting surfaces were formed in the surfaces and reflecting surfaces were formed in the surfaces of transparent body, whereas the present embodiment is the finder system composed of only reflecting surfaces.

In FIG. 13, reference numeral 800 designates the finder system of the present embodiment, and is comprised of two reflecting mirrors, a convex mirror having a first reflecting surface R1 and a concave mirror having a second reflecting surface R2, in order from the object side. In the present embodiment, the first reflecting surface R1 forms a front unit having a negative power while the second reflecting surface R2 forms a rear unit having a positive power. The two reflecting surfaces both are inclined relative to the reference axis and are curved reflecting surfaces.

Numeral 7 is the exit pupil, and the observer observes the finder view with one's pupil here. Numeral 3 is the reference axis of the finder system 1.

The convex mirror and concave mirror are integrally formed by injection molding or the like on a substrate not shown.

The imaging action in the present embodiment will be described. The beam from the object (a beam from the object at the distance 1 m in the present embodiment) is incident to the first reflecting surface R1 to become a diverging beam by the negative power of the convex mirror and is reflected left-downward on the plane of FIG. 13 so as to be incident to the second reflecting surface R2.

Then angles of divergence of this beam are weakened by the positive power of the concave mirror at the second reflecting surface R2 and the beam is reflected in the positive direction of the Z-axis so as to make the emergent reference axis parallel to the incident reference axis to be emitted from the finder system 800 as an observation beam of diopter −1. The object beam intersects at the exit pupil 7 a certain distance apart from the finder system 800, where the object image is observed.

Since the present embodiment has the finder system 800 composed of only the reflecting surfaces, it has the effect of no occurrence of chromatic aberration.

The incident reference axis to the finder system 800 is parallel to the emergent reference axis from the finder system 800 and directions thereof are the same. Accordingly, the direction of observation with the finder is coincident with the photographing direction.

Advantageous points of the present embodiment for construction of camera are the same as in Embodiment 4.

If the two reflecting mirrors are integrally constructed as in the present embodiment, there is the effect that the finder can be made at low cost.

Further, the present embodiment is also arranged so that the reflecting surfaces are rotationally asymmetric surfaces, thereby effecting well-balanced correction for decentration aberration and thus improving the optical performance.

Further, the present embodiment is also arranged so that the number of reflecting surfaces is even and so that no image inversion occurs because no real image is formed in the finder system 800, thus achieving the thin finder system.

Embodiment 6 was the finder with the angular magnification smaller than 1, but the angular magnification can be set greater than 1 by giving a positive power to the first reflecting surface and a negative power to the second reflecting surface and properly selecting the distance between them.

If each reflecting surface is an appropriate, rotationally asymmetric surface and if different powers are given in the Y-axis direction and in the X-axis direction, an afocal system can be constructed so as to convert the incident beam at different angular magnifications in the ZY plane and in the ZX plane as in Embodiment 3.

Next described are numerical embodiments and performance thereof.

Since Numerical Embodiments 1 to 3 are converters and afocal element, component data thereof will be shown in a state wherein they are mounted to a certain master lens.

First described is component data of the master lens and performance of the master lens alone.

[Component data of the master lens]

| | Focal length | | | 10.0 mm | | |
|---|---|---|---|---|---|---|
| | Horizontal half view angle | | | 10.2° | | |
| | Vertical half view angle | | | 13.50 | | |
| | Aperture diameter | | | φ3.00 | | |
| | Image size | | | 4.8 mm × 3.6 mm | | |
| i | Yi | Zi | θi | Di | Ndi | vdi |
| 1 | 0.00 | 0.00 | 0.00 | 1.50 | 1 | | aperture |
| 2 | 0.00 | 1.50 | 0.00 | 1.80 | 1.77250 | 49.60 | refracting surface |
| 3 | 0.00 | 3.30 | 0.00 | 0.90 | 1 | | refracting surface |
| 4 | 0.00 | 4.20 | 0.00 | 0.50 | 1.80518 | 25.43 | refracting surface |
| 5 | 0.00 | 4.70 | 0.00 | 1.00 | 1 | | refracting surface |
| 6 | 0.00 | 5.70 | 0.00 | 2.00 | 1.80400 | 46.57 | refracting surface |
| 7 | 0.00 | 7.70 | 0.00 | 0.20 | 1 | | refracting surface |
| 8 | 0.00 | 7.90 | 0.00 | 2.20 | 1.77250 | 49.60 | refracting surface |
| 9 | 0.00 | 10.10 | 0.00 | 1.00 | 1 | | refracting surface |
| 10 | 0.00 | 11.10 | 0.00 | 4.00 | 1.51633 | 64.15 | refracting surface |
| 11 | 0.00 | 15.10 | 0.00 | 2.00 | 1 | | refracting surface |
| 12 | 0.00 | 17.10 | 0.00 | | 1 | | image plane |

| Shape of spherical surface |
|---|
| R2 surface $R_2 = 4.773$ |
| R3 surface $R_3 = -24.372$ |
| R4 surface $R_4 = -6.775$ |
| R5 surface $R_5 = 4.878$ |
| R6 surface $R_6 = 0.322$ |
| R7 surface $R_7 = -6.419$ |
| R8 surface $R_8 = 10.815$ |
| R9 surface $R_9 = -37.758$ |
| R10 surface $R_{10} = \infty$ |
| R11 surface $R_{11} = \infty$ |

Figure 14:
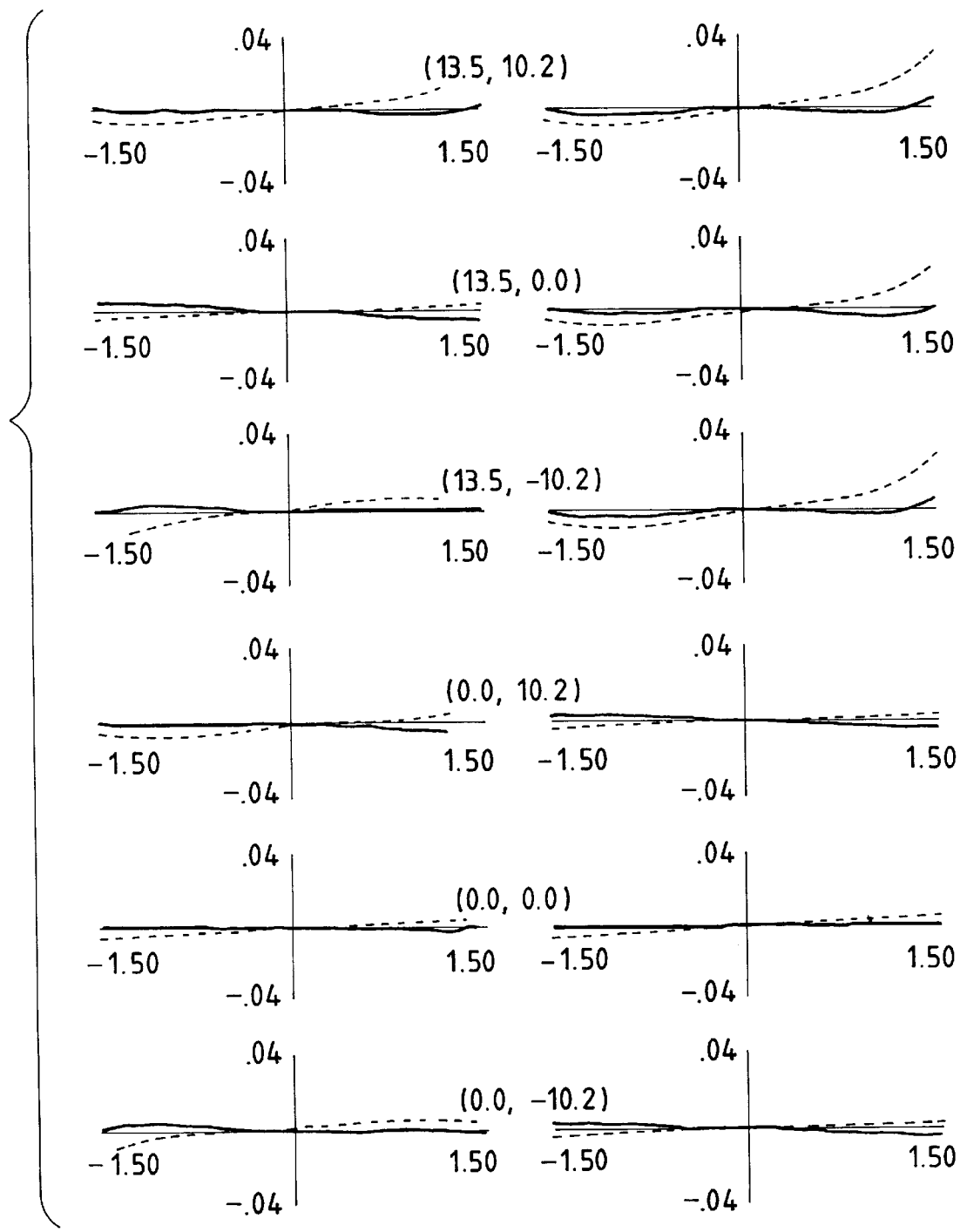
FIG. 14 is a transverse aberration diagram of the master lens (including transverse aberration diagrams of beams at angles of incidence in combination of horizontal incident angle and verticle incident angle being $(u_y, u_x)$, $(0, u_x)$, $(-u_y, u_x)$, $(u_y, 0)$, $(0, 0)$, and $-u_y, 0)$)

FIG. 7 is a cross-sectional view and optical path diagram of the master lens alone and FIG. 14 is an aberration diagram of the master lens alone.

[Numerical Embodiment 1: wide converter]

| | Converter magnification | | | ×0.72 | | |
|---|---|---|---|---|---|---|
| | Horizontal half view angle | | | 14.4° | | |
| | Vertical half view angle | | | 18.9° | | |
| | Aperture diameter | | | φ3.0 | | |
| | Image size | | | 4.8 mm × 3.6 mm | | |
| i | Yi | Zi | θi | Di | Ndi | vdi |
| Wide converter | | | | | | | |
| 1 | 0.00 | 1.00 | 0.00 | 5.00 | 1.51633 | 64.15 | refracting surface |
| 2 | 0.00 | 6.00 | 45.00 | 10.00 | 1.51633 | 64.15 | reflecting surface |
| 3 | −10.00 | 6.00 | 45.00 | 5.00 | 1.51633 | 64.15 | reflecting surface |
| 4 | −10.00 | 11.00 | 0.00 | 1.00 | 1 | | refracting surface |
| Master lens | | | | | | | |
| 5 | −10.00 | 12.00 | 0.00 | 1.50 | 1 | | aperture |
| 6 | −10.00 | 13.50 | 0.00 | 1.80 | 1.77250 | 49.60 | refracting surface |
| 7 | −10.00 | 15.30 | 0.00 | 0.90 | 1 | | refracting surface |
| 8 | −10.00 | 16.20 | 0.00 | 0.50 | 1.80518 | 25.43 | refracting surface |
| 9 | −10.00 | 16.70 | 0.00 | 1.00 | 1 | | refracting surface |
| 10 | −10.00 | 17.70 | 0.00 | 2.00 | 1.80400 | 46.57 | refracting surface |
| 11 | −10.00 | 19.70 | 0.00 | 0.20 | 1 | | refracting surface |
| 12 | −10.00 | 19.90 | 0.00 | 2.20 | 1.77250 | 49.60 | refracting surface |
| 13 | −10.00 | 22.10 | 0.00 | 1.00 | 1 | | refracting surface |
| 14 | −10.00 | 23.10 | 0.00 | 4.00 | 1.51633 | 64.15 | refracting surface |
| 15 | −10.00 | 27.10 | 0.00 | 2.00 | 1 | | refracting surface |
| 16 | −10.00 | 29.10 | 0.00 | | 1 | | image plane |

| Shape of spherical surface |
|---|
| R6 surface $R_6 = 4.773$ |
| R7 surface $R_7 = -24.372$ |
| R8 surface $R_8 = -6.775$ |
| R9 surface $R_9 = 4.878$ |
| R10 surface $R_{10} = -10.322$ |
| R11 surface $R_{11} = -6.419$ |
| R12 surface $R_{12} = 10.815$ |
| R13 surface $R_{13} = -37.758$ |
| R14 surface $R_{14} = \infty$ |
| R15 surface $R_{15} = \infty$ |
| Shape of aspherical surface |

R1 surface $C_{02} = -2.67512e-02$   $C_{20} = -2.74134e-02$
$C_{03} = 7.15647e-04$   $C_{21} = 4.34541e-04$
$C_{04} = 3.67535e-04$   $C_{22} = 2.97174e-04$   $C_{40} = 1.75325e-04$ R2 surface $C_{02} = 1.03548e-03$   $C_{20} = 1.15191e-03$
$C_{03} = 6.16435e-05$   $C_{21} = 1.75793e-04$
$C_{04} = 3.45036e-05$   $C_{22} = -1.60671e-05$   $C_{40} = 2.51901e-05$ R3 surface $C_{02} = 1.81460e-03$   $C_{20} = 1.86118e-03$
$C_{03} = -2.25816e-05$   $C_{21} = 2.29947e-04$
$C_{04} = 2.29400e-05$   $C_{22} = -1.96683e-04$   $C_{40} = -9.59772e-05$ R4 surface $C_{02} = -1.15149e-02$   $C_{20} = -1.61810e-02$
$C_{03} = -6.19449e-04$   $C_{21} = 2.51776e-04$
$C_{04} = 2.80910e-04$   $C_{22} = -1.19571e-03$   $C_{40} = -6.97817e-05$ In the case of Numerical Embodiment 1, the power of each surface and powers of the front group and rear group are as follows:

| Surface power (surface power at azimuth 0) |
|---|
| R1 −0.02763 |
| R2 −0.00888 |
| R3 0.01557 |
| R4 0.01189 |

-continued

| Group power (group power at azimuth 0) | |
|---|---|
| Front group (R1–R2) | −0.03732 |
| Rear group (R3–R4) | 0.02685 |

Figure 15:
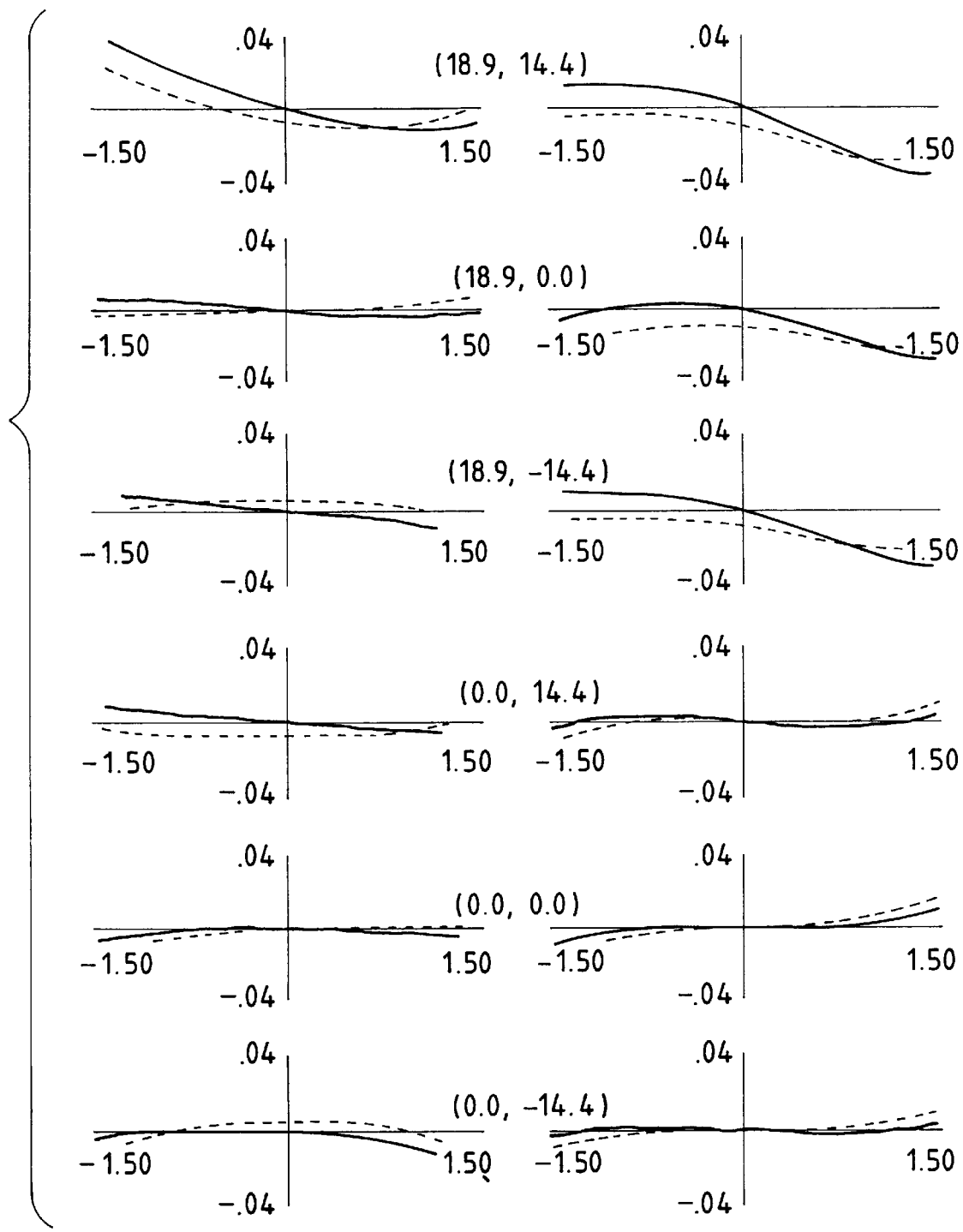
FIG. 15 is a transverse aberration diagram of a combined system in which Numerical Embodiment 1 is attached to the master lens (including transverse aberration diagrams of beams at angles of incidence in combinations of horizontal incident angle and vertical incident angle being $(u_y, u_x)$, $(0, u_x)$, $(-u_y, u_x)$, $(u_y, 0)$, $(0, 0)$, and $(-u_y, 0)$)

FIG. 6 is a cross-sectional view and optical path diagram of Numerical Embodiment 1. Further, FIG. 15 is an aberration diagram of a combined system where the wide converter of Numerical Embodiment 1 is added to the master lens. From comparison between the aberration diagram (FIG. 14) of the master lens alone and FIG. 15, it is seen that excellent optical performance is maintained even after the magnification conversion of about 0.7 by the wide converter of Numerical Embodiment 1.

[Numerical Embodiment 2: tele-converter]

| | Converter magnification | | | ×1.38 | | |
|---|---|---|---|---|---|---|
| | Horizontal half view angle | | | 7.3° | | |
| | Vertical half view angle | | | 9.7° | | |
| | Aperture diameter | | | φ3.0 | | |
| | Image size | | | 4.8 mm × 3.6 mm | | |
| i | Yi | Zi | θi | Di | Ndi | vdi |
| Tele-converter | | | | | | |
| 1 | 0.00 | 1.00 | 0.00 | 5.00 | 1.51633 | 64.15 refracting surface |
| 2 | 0.00 | 6.00 | 45.00 | 7.00 | 1.51633 | 64.15 reflecting surface |
| 3 | −7.00 | 6.00 | 45.00 | 3.00 | 1.51633 | 64.15 reflecting surface |
| 4 | −7.00 | 9.00 | 0.00 | 1.00 | 1 | refracting surface |
| Master lens | | | | | | |
| 5 | −7.00 | 10.00 | 0.00 | 1.50 | 1 | aperture |
| 6 | −7.00 | 11.50 | 0.00 | 1.80 | 1.77250 | 49.60 refracting surface |
| 7 | −7.00 | 13.30 | 0.00 | 0.90 | 1 | refracting surface |
| 8 | −7.00 | 14.20 | 0.00 | 0.50 | 1.80518 | 25.43 refracting surface |
| 9 | −7.00 | 14.70 | 0.00 | 4.00 | 1 | refracting surface |
| 10 | −7.00 | 15.70 | 0.00 | 2.00 | 1.80400 | 46.57 refracting surface |
| 11 | −7.00 | 17.70 | 0.00 | 0.20 | 1 | refracting surface |
| 12 | −7.00 | 17.90 | 0.00 | 2.20 | 1.77250 | 49.60 refracting surface |
| 13 | −7.00 | 20.10 | 0.00 | 1.00 | 1 | refracting surface |
| 14 | −7.00 | 21.10 | 0.00 | 4.00 | 1.51633 | 64.15 refracting surface |
| 15 | −7.00 | 25.10 | 0.00 | 2.04 | 1 | refracting surface |
| 16 | −7.00 | 27.14 | 0.00 | | | image plane |

Shape of spherical surface

R6 surface $R_6$ = 4.773
R7 surface $R_7$ = −24.372
R8 surface $R_8$ = −6.775
R9 surface $R_9$ = 4.878
R10 surface $R_{10}$ = −10.322
R11 surface $R_{11}$ = −6.419
R12 surface $R_{12}$ = 10.815
R13 surface $R_{13}$ = '37.758
R14 surface $R_{14}$ = ∞
R15 surface $R_{15}$ = ∞

Shape of aspherical surface

R1 surface $C_{02}$ = 1.83511e-02    $C_{20}$ = 2.29738e-02
$C_{03}$ = −4.05015e-04   $C_{21}$ = 1.29194e-03
$C_{04}$ = −1.72755e-05   $C_{22}$ = 5.40491e-05    $C_{40}$ = −4.28384e-05

R2 surface $C_{02}$ = −2.59648e-03   $C_{20}$ = −2.24803e-03
$C_{03}$ = 2.70082e-05    $C_{21}$ = 6.29063e-04
$C_{04}$ = −1.93997e-06   $C_{22}$ = −1.20417e-05   $C_{40}$ = −4.53753e-05

R3 surface $C_{02}$ = −4.05369e-03   $C_{20}$ = −3.13663e-03
$C_{03}$ = 3.50679e-04    $C_{21}$ = 1.09111e-03
$C_{04}$ = −2.36307e-05   $C_{22}$ = 1.19610e-05    $C_{40}$ = −1.14972e-04

R4 surface $C_{02}$ = 1.78770e-02    $C_{20}$ = 2.96049e-02
$C_{03}$ = 3.15643e-03    $C_{21}$ = 3.26124e-03
$C_{04}$ = −3.85761e-04   $C_{22}$ = 1.24482e-03    $C_{40}$ = −1.86282e-04

In the case of Numerical Embodiment 2, the power of each surface and powers of the front group and rear group are as follows:

| Surface power (surface power at azimuth 0) | |
|---|---|
| R1 | 0.01895 |
| R2 | 0.02227 |
| R3 | −0.03477 |
| R4 | −0.01846 |

| Group power (group power at azimuth 0) | |
|---|---|
| Front group (R1–R2) | 0.03983 |
| Rear group (R3–R4) | −0.05450 |

FIG. 9 is a cross-sectional view and optical path diagram of Numerical Embodiment 2. Further, FIG. 16 is an aberration diagram of a combined system where the tele-converter of Numerical Embodiment 2 is added to the master lens.

In the case of the present numerical embodiment, Power of refracting entrance surface/power of refracting exit surface = −1.027, and thus the powers of the two refracting surfaces are different in sign but nearly equal in absolute value.

Figure 16:
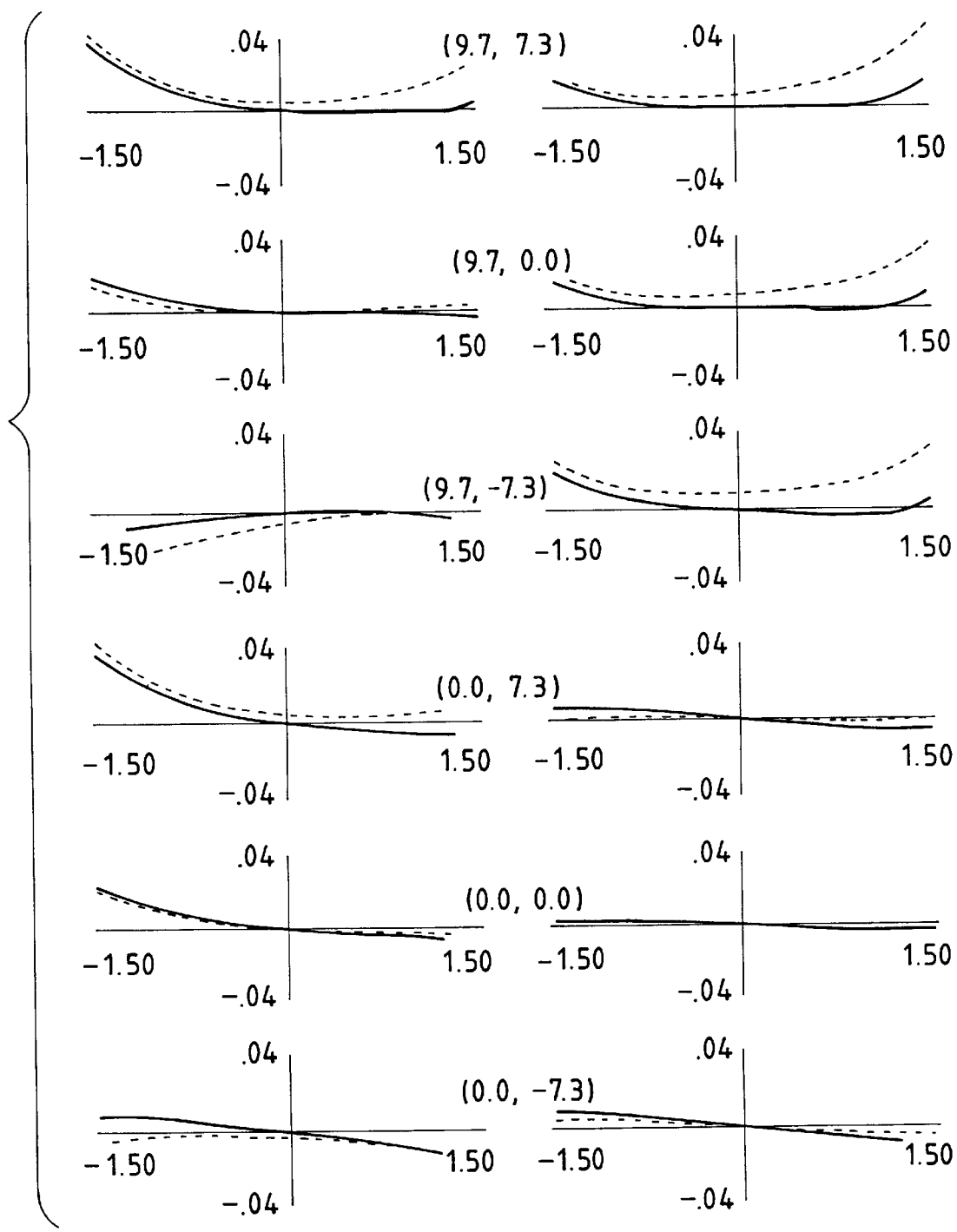
FIG. 16 is a transverse aberration diagram of a combined system in which Numerical Embodiment 2 is attached to the master lens (including transverse aberration diagrams of beams at angles of incidence in combinations of horizontal incident angle and vertical incident angle being $(u_y, u_x)$, $(0, u_x)$, $(-u_y, u_x)$, $(u_y, 0)$, $(0, 0)$, and $(-u_y, 0)$)

From comparison between the aberration diagram (FIG. 14) of the master lens alone and FIG. 16, it is seen that excellent optical performance is maintained even after the magnification conversion of about 1.4 by the tele-converter of Numerical Embodiment 2.

[Numerical Embodiment 3: afocal element]

| | Afocal magnification | | | ×1.30 (at azimuth 0°) | | |
|---|---|---|---|---|---|---|
| | Afocal magnification | | | ×1.20 (at azimuth 90°) | | |
| | Horizontal half view angle | | | 7.9° | | |
| | Vertical half view angle | | | 11.3° | | |
| | Aperture diameter | | | φ3.0 | | |
| | Image size | | | 4.8 mm × 3.6 mm | | |
| i | Yi | Zi | θi | Di | Ndi | vdi |
| Afocal element | | | | | | |
| 1 | 0.00 | 1.00 | 0.00 | 5.00 | 1.51633 | 64.15 refracting surface |
| 2 | 0.00 | 6.00 | 45.00 | 7.00 | 1.51633 | 64.15 reflecting surface |

-continued

| | | | | | | |
|---|---|---|---|---|---|---|
| 3 | −7.00 | 6.00 | 45.00 | 3.00 | 1.51633 | 64.15 | reflecting surface |
| 4 | −7.00 | 9.00 | 0.00 | 1.00 | 1 | | refracting surface |

Master lens

| | | | | | | |
|---|---|---|---|---|---|---|
| 5 | −7.00 | 10.00 | 0.00 | 1.50 | 1 | | aperture |
| 6 | −7.00 | 11.50 | 0.00 | 1.80 | 1.77250 | 49.60 | refracting surface |
| 7 | −7.00 | 13.30 | 0.00 | 0.90 | 1 | | refracting surface |
| 8 | −7.00 | 14.20 | 0.00 | 0.50 | 1.80518 | 25.43 | refracting surface |
| 9 | −7.00 | 14.70 | 0.00 | 1.00 | 1 | | refracting surface |
| 10 | −7.00 | 15.70 | 0.00 | 2.00 | 1.80400 | 46.57 | refracting surface |
| 11 | −7.00 | 17.70 | 0.00 | 0.20 | 1 | | refracting surface |
| 12 | −7.00 | 17.90 | 0.00 | 2.20 | 1.77250 | 49.60 | refracting surface |
| 13 | −7.00 | 20.10 | 0.00 | 1.00 | 1 | | refracting surface |
| 14 | −7.00 | 21.10 | 0.00 | 4.00 | 1.51633 | 64.15 | refracting surface |
| 15 | −7.00 | 25.10 | 0.00 | 1.99 | 1 | | refracting surface |
| 16 | −7.00 | 27.09 | 0.00 | | 1 | | image plane |

Shape of spherical surface

R6 surface $R_6$ = 4.773
R7 surface $R_7$ = −24.372
R8 surface $R_8$ = −6.775
R9 surface $R_9$ = 4.878
R10 surface $R_{10}$ = −10.322
R11 surface $R_{11}$ = −6.419
R12 surface $R_{12}$ = 10.815
R13 surface $R_{13}$ = −37.758
R14 surface $R_{14}$ = ∞
R15 surface $R_{15}$ = ∞

Shape of aspherical surface

R1 surface $C_{02}$ = 1.17064e-02
$C_{03}$ = −9.14705e-04
$C_{04}$ = −4.49614e-05
$C_{20}$ = 1.26172e-02
$C_{21}$ = −2.00066e-06
$C_{22}$ = −9.44552e-06
$C_{40}$ = −1.46841e-05

R2 surface $C_{02}$ = −2.89686e-03
$C_{03}$ = −4.28567e-05
$C_{04}$ = 1.48977e-06
$C_{20}$ = −2.05637e-03
$C_{21}$ = 9.74211e-05
$C_{22}$ = −1.13021e-05
$C_{40}$ = −1.33463e-05

R3 surface $C_{02}$ = −3.29595e-03
$C_{03}$ = 2.30953e-04
$C_{04}$ = −4.38224e-06
$C_{20}$ = −2.69858e-03
$C_{21}$ = 3.01576e-04
$C_{22}$ = −5.25776e-05
$C_{40}$ = −3.66853e-05

R4 surface $C_{02}$ = 1.67177e-02
$C_{03}$ = 2.13411e-03
$C_{04}$ = −1.54345e-04
$C_{20}$ = 1.26058e-02
$C_{21}$ = 1.10650e-03
$C_{22}$ = −1.60266e-04
$C_{40}$ = −8.88168e-05

In the case of Numerical Embodiment 3, the power of each surface and powers of the front group and rear group are as follows:

| Surface power (surface power at azimuth 0) | |
|---|---|
| R1 | 0.01209 |
| R2 | 0.02485 |
| R3 | −0.02827 |
| R4 | −0.01726 |

| Group power (group power at azimuth 0) | |
|---|---|
| Front group (R1–R2) | 0.03595 |
| Rear group (R3–R4) | −0.04650 |

| Group power (group power at azimuth 90) | |
|---|---|
| Front group (R1–R2) | 0.02147 |
| Rear group (R3–R4) | −0.02489 |

Figure 17:
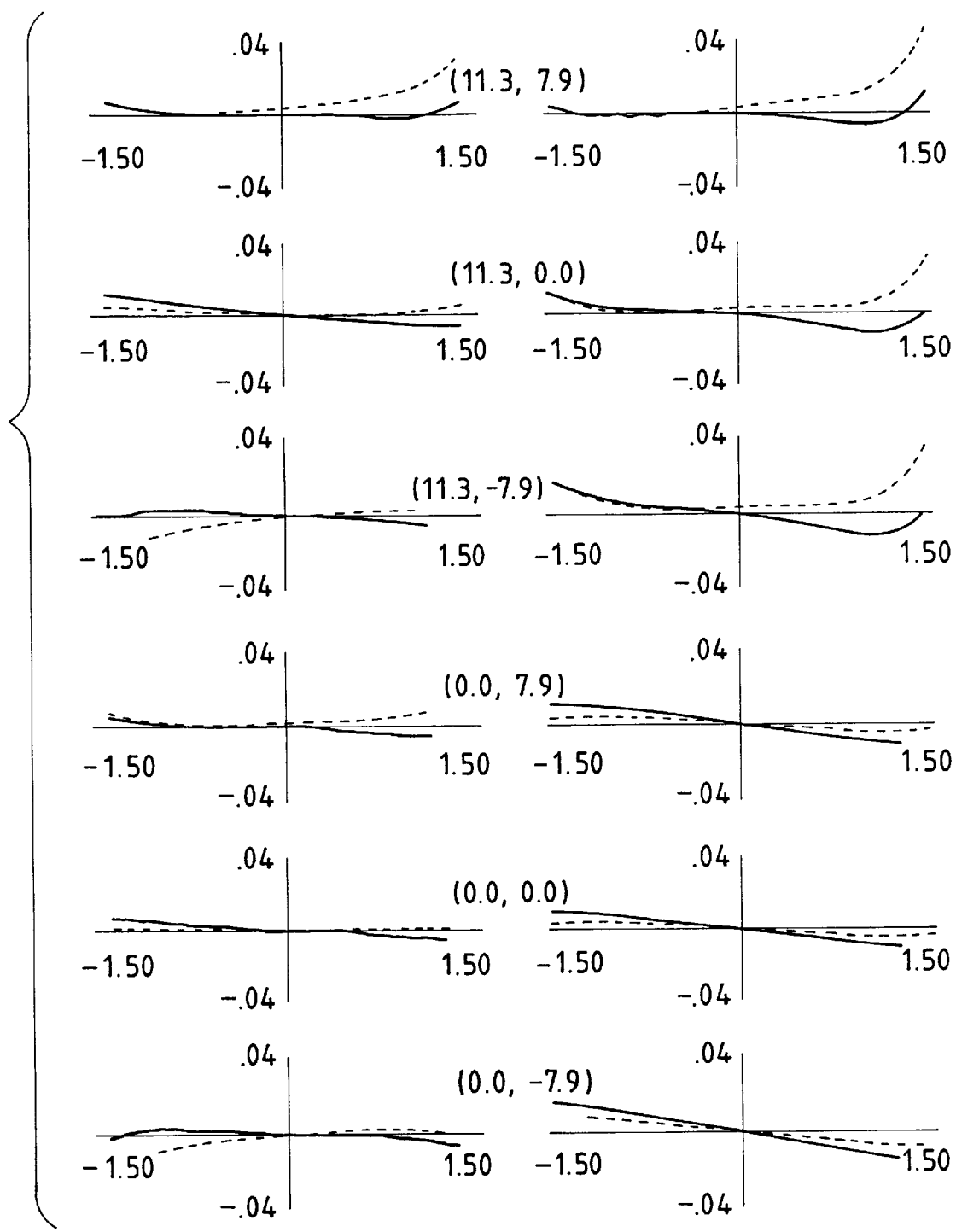
FIG. 17 is a transverse aberration diagram of a combined system in which Numerical Embodiment 3 is attached to the master lens (including transverse aberration diagrams of beams at angles of incidence in combinations of horizontal incident angle and vertical incident angle being $(u_y, u_x)$, $(0, u_x)$, $(-u_y, u_x)$, $(u_y, 0)$, $(0, 0)$, and $(-u_y, 0)$)

FIG. 10 is a cross-sectional view and optical path diagram of Numerical Embodiment 3. Further, FIG. 17 is an aberration diagram of a combined system where the afocal lens of Numerical Embodiment 3 is added to the master lens. From comparison between the aberration diagram (FIG. 14) of the master lens alone and FIG. 17, it is seen that excellent optical performance is maintained even after the conversion of different magnifications in the two directions perpendicular to the reference axis by the afocal lens of Numerical Embodiment 3.

[Numerical Embodiment 4: solid finder system]

| | |
|---|---|
| Angular magnification | ×0.6 |
| Horizontal half view angle | 8.0° |
| Vertical half view angle | 6.0° |
| Pupil diameter | φ4.0 |

| i | Yi | Zi | θi | Di | Ndi | vdi | |
|---|---|---|---|---|---|---|---|
| 1 | 0.00 | 0.00 | 0.00 | 16.00 | 1.77250 | 49.60 | refracting surface |
| 2 | 0.00 | 16.00 | 25.00 | 20.00 | 1.77250 | 49.60 | reflecting surface |
| 3 | −15.32 | 3.14 | 25.00 | 16.00 | 1.77250 | 49.60 | reflecting surface |
| 4 | −15.32 | 19.14 | 0.00 | 16.00 | 1 | | refracting surface |
| 5 | −15.32 | 35.14 | 0.00 | 0.00 | 1 | | pupil |

Shape of aspherical surface

R1 surface $C_{02}$ = 9.36097e-04
$C_{03}$ = −1.87958e-04
$C_{20}$ = −2.44805e-03
$C_{21}$ = −1.29951e-04

R2 surface $C_{02}$ = 7.87520e-03
$C_{03}$ = −2.07350e-04
$C_{04}$ = 1.13682e-06
$C_{05}$ = −7.16009e-08
$C_{06}$ = −4.66897e-09
$C_{20}$ = 6.93463e-03
$C_{21}$ = −3.50341e-04
$C_{22}$ = −5.50695e-07

-continued $C_{23} = 1.99773e-07$
$C_{24} = -3.49980e-08$
$C_{40} = 1.12261e-06$
$C_{41} = -1.85888e-09$
$C_{42} = -5.26526e-10$
$C_{60} = -1.69469e-08$ R3 surface $C_{02} = 4.70925e-03$
$C_{03} = -1.07368e-04$
$C_{04} = -1.11036e-06$
$C_{05} = -4.96427e-08$
$C_{06} = -3.08851e-09$
$C_{20} = 4.56148e-03$
$C_{21} = -2.38986e-04$
$C_{22} = -4.67163e-06$
$C_{23} = -9.41692e-08$
$C_{24} = -1.83818e-10$
$C_{40} = -4.83248e-07$
$C_{41} = -7.67939e-08$
$C_{42} = -9.52489e-09$
$C_{60} = -6.15051e-09$ R4 surface $C_{02} = 1.08323e-03$
$C_{03} = -4.51818e-04$
$C_{20} = -7.64781e-04$
$C_{21} = -7.32932e-04$ In the case of Numerical Embodiment 4, the power of each surface and powers of the front group and rear group are as follows:

Surface power (surface power at azimuth 0)

| | |
|---|---|
| R1 | 0.00145 |
| R2 | -0.06161 |
| R3 | -0.03684 |
| R4 | -0.00167 |

Group power (group power at azimuth 0)

| | |
|---|---|
| Front group (R1–R2) | -0.05936 |
| Rear group (R3–R4) | 0.03572 |

Figure 18:
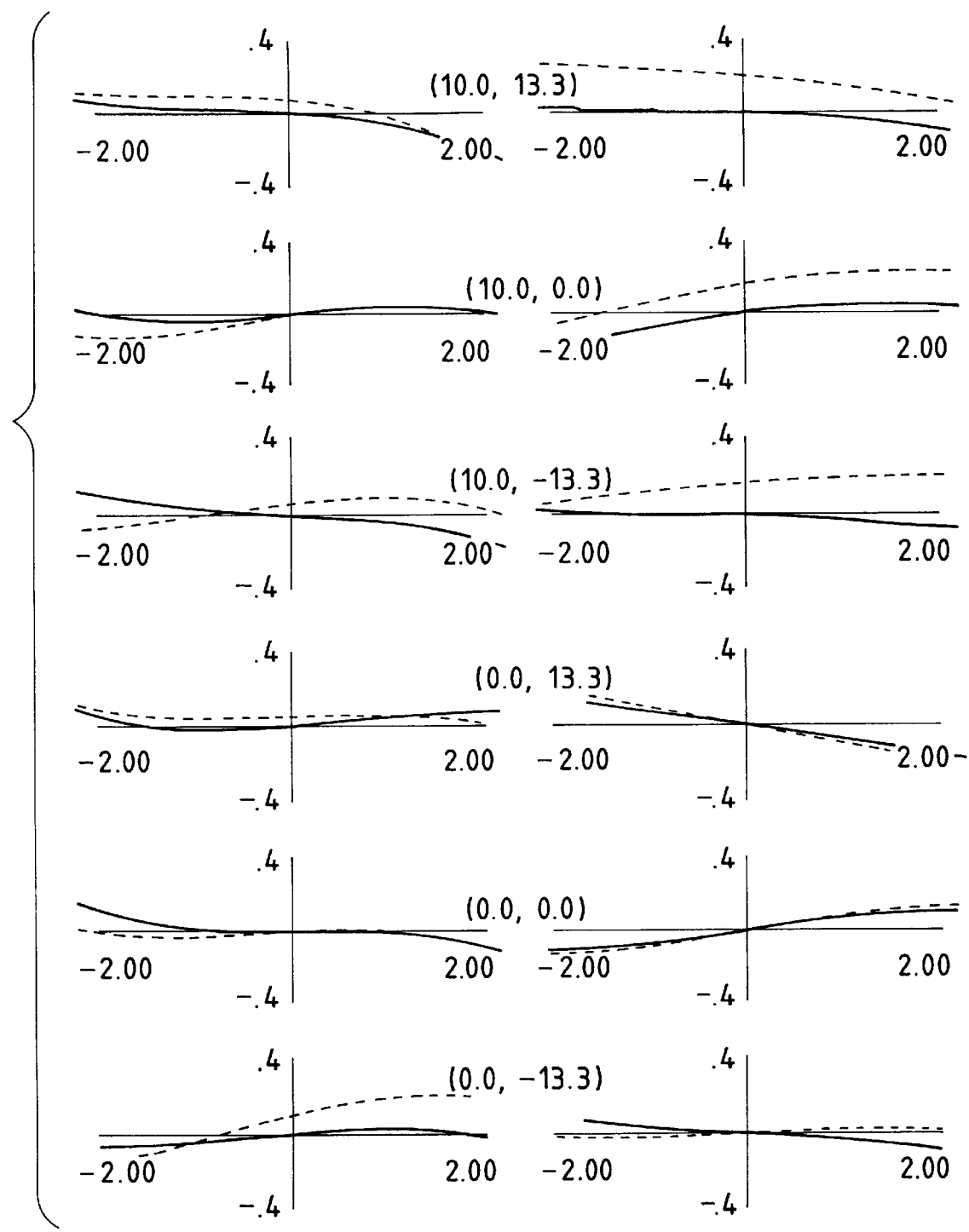
FIG. 18 is a transverse aberration diagram of Numerical Embodiment 4 (including transverse aberration diagrams of beams at angles of incidence in combinations of horizontal incident angle and vertical incident angle being $(u_y, u_x)$, $(0, u_x)$, $(-u_y, u_x)$, $(u_y, 0)$, $(0, 0)$, and $(-u_y, 0)$)

FIG. 11 is a cross-sectional view and optical path diagram of Numerical Embodiment 4. Further, FIG. 18 is an aberration diagram of the finder system of Numerical Embodiment 4.

[Numerical Embodiment 5: solid finder system]

| | | | | |
|---|---|---|---|---|
| Angular magnification | | | ×0.5 | |
| Horizontal half view angle | | | 8.0° | |
| Vertical half view angle | | | 6.0° | |
| Pupil diameter | | | φ6.0 | |

| i | Yi | Zi | θi | Di | Ndi | vdi | |
|---|---|---|---|---|---|---|---|
| 1 | 0.00 | 0.00 | 0.00 | 22.00 | 1.77250 | 49.60 | refracting surface |
| 2 | 0.00 | 22.00 | 30.00 | 32.00 | 1.77250 | 49.60 | reflecting surface |
| 3 | -17.32 | 6.00 | 30.00 | 20.00 | 1.77250 | 49.60 | reflecting surface |
| 4 | -17.32 | 26.00 | 30.00 | 20.00 | 1.77250 | 49.60 | reflecting surface |
| 5 | -45.03 | 16.00 | 30.00 | 16.00 | 1.77250 | 49.60 | reflecting surface |
| 6 | -45.03 | 32.00 | 0.00 | 16.00 | 1 | | refracting surface |
| 7 | -45.03 | 48.00 | 0.00 | 0.00 | 1 | | pupil |

-continued

Shape of aspherical surface

R1 surface $C_{02} = -3.00694e-04$
$C_{03} = -1.11882e-05$
$C_{04} = -1.78138e-06$
$C_{20} = -3.29925e-03$
$C_{21} = 1.38080e-05$
$C_{22} = 7.36350e-06$
$C_{40} = 1.80498e-06$ R2 surface $C_{02} = 2.38149e-03$
$C_{03} = -2.15461e-05$
$C_{04} = -7.92596e-07$
$C_{05} = 4.00184e-08$
$C_{06} = -7.27549e-11$
$C_{20} = 2.02727e-03$
$C_{21} = -6.44451e-05$
$C_{22} = 2.71966e-06$
$C_{23} = -4.54000e-08$
$C_{24} = 3.17581e-09$
$C_{40} = 2.81585e-06$
$C_{41} = 9.20629e-08$
$C_{42} = -3.31928e-09$
$C_{60} = 2.07600e-10$ R3 surface $C_{02} = 3.50273e-03$
$C_{03} = -1.13738e-05$
$C_{04} = -3.78711e-07$
$C_{05} = 7.78498e-08$
$C_{06} = -8.93509e-10$
$C_{20} = 8.77505e-04$
$C_{21} = -2.43074e-05$
$C_{22} = -4.12968e-06$
$C_{23} = -1.73356e-07$
$C_{24} = 1.50250e-08$
$C_{40} = 3.08302e-06$
$C_{41} = 1.96443e-07$
$C_{42} = -1.13734e-08$
$C_{60} = -1.19388e-08$ R4 surface $C_{02} = 9.12745e-03$
$C_{03} = 7.96682e-05$
$C_{04} = 2.11067e-06$
$C_{05} = 5.35901e-07$
$C_{06} = 9.63673e-09$
$C_{20} = 2.13432e-03$
$C_{21} = 1.74296e-04$
$C_{22} = -1.53749e-05$
$C_{23} = -1.56828e-06$
$C_{24} = 9.32343e-08$
$C_{40} = 1.15330e-06$
$C_{41} = -4.09178e-08$
$C_{42} = -3.32178e-08$
$C_{60} = -3.11447e-08$ R5 surface $C_{02} = 4.00484e-03$
$C_{03} = 2.39662e-05$
$C_{04} = 8.88344e-07$
$C_{05} = 2.77967e-08$
$C_{06} = 1.90442e-10$
$C_{20} = 1.97253e-03$
$C_{21} = 1.10798e-04$
$C_{22} = -5.84782e-06$
$C_{23} = -3.71432e-07$
$C_{24} = 2.02670e-08$
$C_{40} = -9.02457e-07$
$C_{41} = -8.22948e-08$
$C_{42} = 2.09767e-09$
$C_{60} = -1.34200e-08$ R6 surface $C_{02} = -9.59374e-04$
$C_{03} = -2.23333e-05$
$C_{04} = 4.21472e-06$ -continued $C_{20} = -2.22479e-03$
$C_{21} = 1.72465e-04$
$C_{22} = -1.25045e-05$
$C_{40} = -1.76663e-06$ In the case of Numerical Embodiment 5, the power of each surface and powers of the front group and rear group are as follows:

| Surface power (surface power at azimuth 0) | |
|---|---|
| R1 | −0.00047 |
| R2 | −0.01950 |
| R3 | 0.02868 |
| R4 | −0.07473 |
| R5 | 0.03279 |
| R6 | 0.00148 |
| Group power (group power at azimuth 0) | |
| Front group (R1–R4) | −0.06692 |
| Rear group (R5–R6) | 0.03383 |

Figure 19:
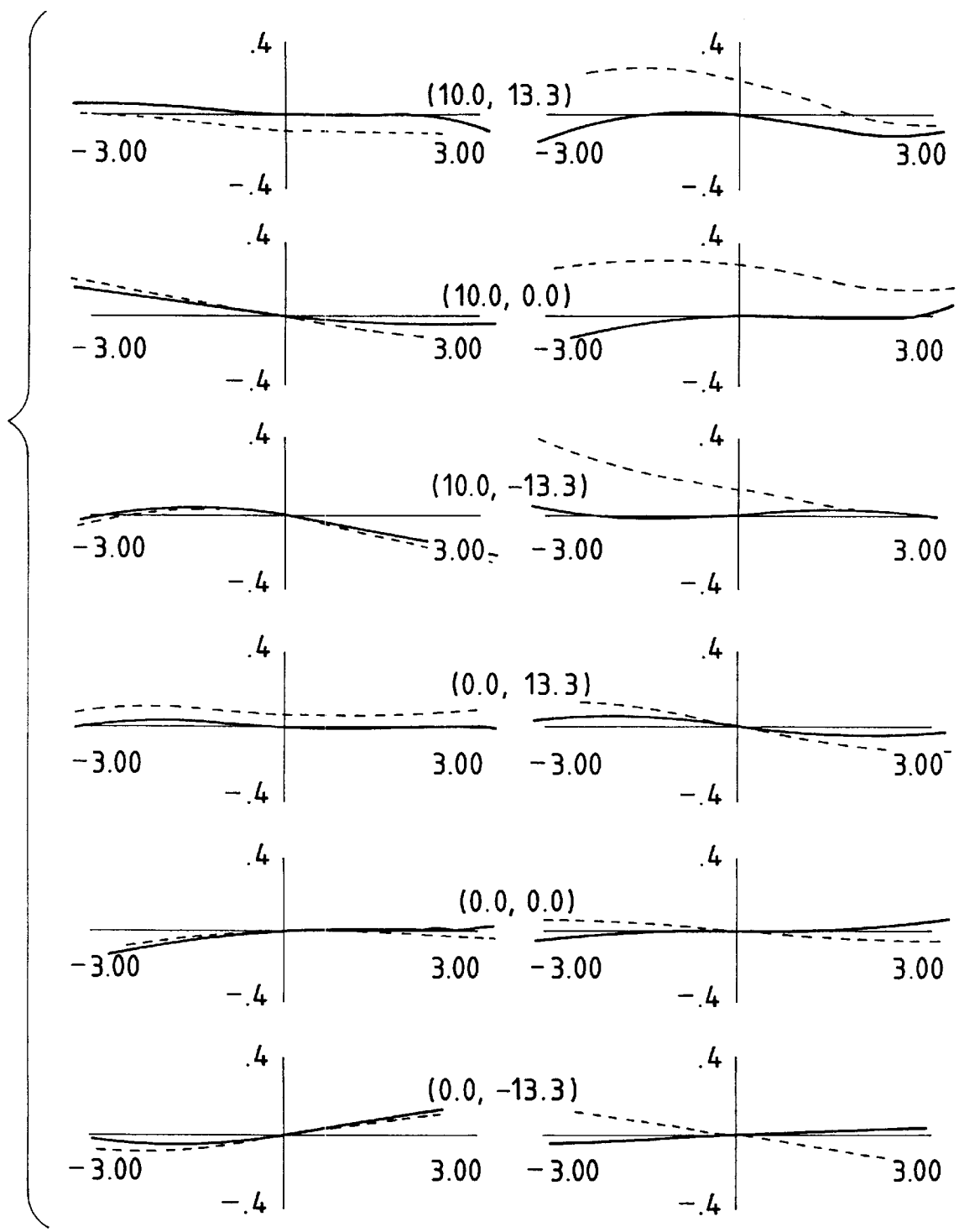
FIG. 19 is a transverse aberration diagram of Numerical Embodiment 5 (including transverse aberration diagrams of beams at angles of incidence in combinations of horizontal incident angle and vertical incident angle being $(u_y, u_x)$, $(0, u_x)$, $(-u_y, u_x)$, $(u_y, 0)$, $(0, 0)$, and $(-u_y, 0)$)

FIG. 12 is a cross-sectional view and optical path diagram of Numerical Embodiment 5. Further, FIG. 19 is an aberration diagram of the finder system of Numerical Embodiment 5.

[Numerical Embodiment 6: finder system having a space]

| | | Angular magnification | | | x0.8 | |
|---|---|---|---|---|---|---|
| | | Horizontal half view angle | | | 8.0° | |
| | | Vertical half view angle | | | 6.0° | |
| | | Pupil diameter | | | φ4.0 | |
| i | Yi | Zi | θi | Di | Ndi | vdi |
| 1 | 0.00 | 0.00 | 30.00 | 25.0 | 1 | reflecting surface |
| 2 | −21.65 | −12.50 | 30.00 | 32.00 | 1 | reflecting surface |
| 3 | −21.65 | 19.50 | 0.00 | 0.00 | 1 | pupil |

Shape of aspherical surface

R1 surface

| | | |
|---|---|---|
| $C_{02} = 2.00110e-03$ | $C_{20} = 2.49455e-03$ | |
| $C_{03} = -5.92637e-06$ | $C_{21} = -5.37303e-05$ | |
| $C_{04} = 4.47276e-08$ | $C_{22} = 8.13412e-07$ | $C_{40} = 1.83010e-07$ |
| $C_{05} = 2.02267e-08$ | $C_{23} = 1.79526e-07$ | $C_{41} = 3.36439e-08$ |
| $C_{06} = -1.51968e-10$ | $C_{24} = -6.36031e-09$ | $C_{42} = -2.80689e-09$ |
| $C_{60} = 1.67516e-09$ | | |

R2 surface

| | | |
|---|---|---|
| $C_{02} = 1.53869e-03$ | $C_{20} = 1.93911e-03$ | |
| $C_{03} = -6.93084e-06$ | $C_{21} = -5.59358e-05$ | |
| $C_{04} = 5.48020e-08$ | $C_{22} = 1.08200e-06$ | $C_{40} = 3.11679e-07$ |
| $C_{05} = 4.07823e-08$ | $C_{23} = 4.38704e-07$ | $C_{41} = 6.15339e-08$ |
| $C_{06} = -6.10130e-10$ | $C_{24} = -2.27447e-08$ | $C_{42} = -6.35782e-09$ |
| $C_{60} = 1.31672e-09$ | | |

In the case of Numerical Embodiment 6, the power of each surface and powers of the front group and rear group are as follows:

| Surface power (surface power at azimuth 0) | |
|---|---|
| R1 | −0.00047 |
| R2 | 0.00711 |

Figure 20:
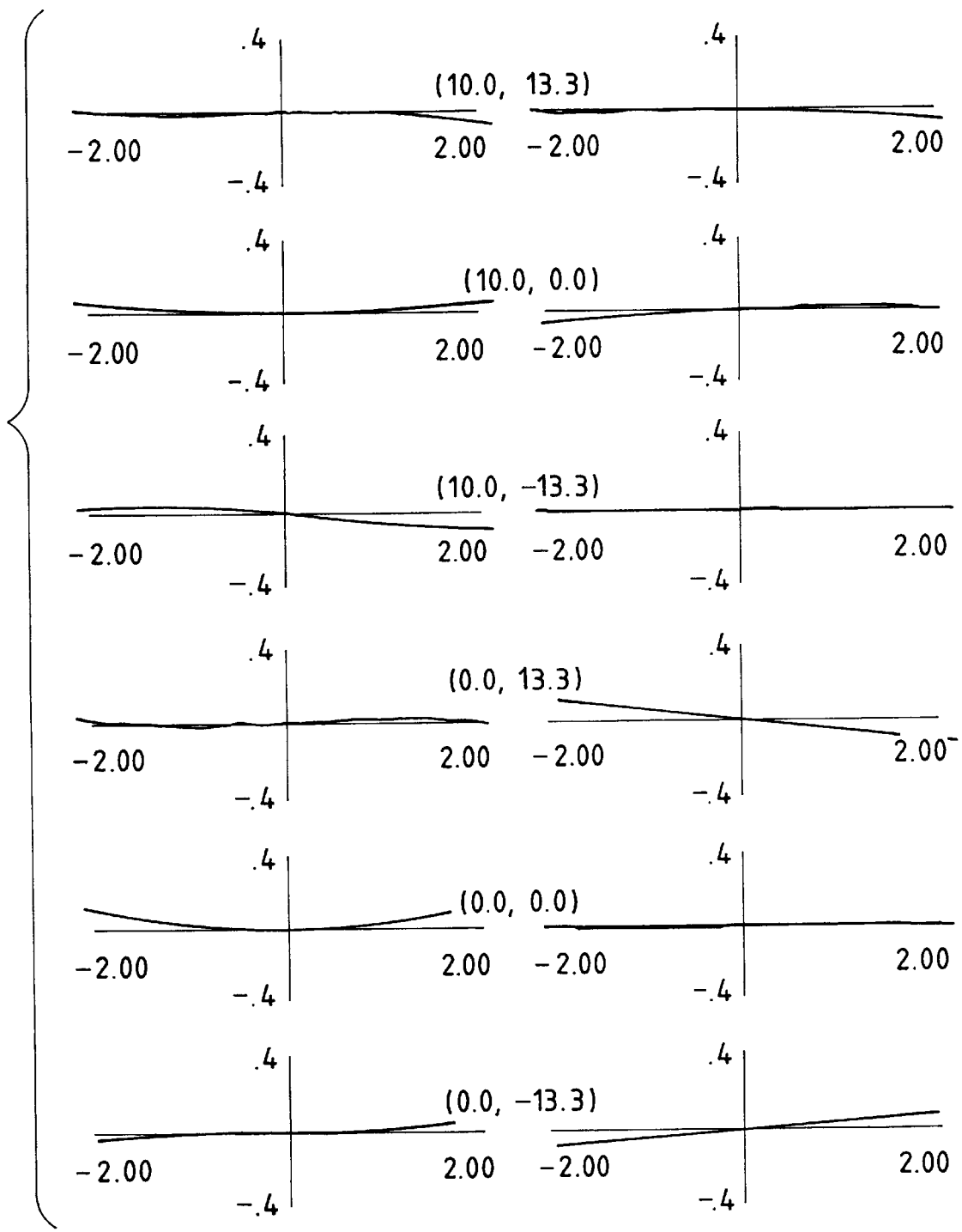
FIG. 20 is a transverse aberration diagram of Numerical Embodiment 6 (including transverse aberration diagrams of beams at angles of incidence in combinations of horizontal incident angle and vertical incident angle being $(u_y, u_x)$, $(0, u_x)$, $(-u_y, u_x)$, $(u_y, 0)$, $(0, 0)$, and $(-u_y, 0)$).

FIG. 13 is a cross-sectional view and optical path diagram of Numerical Embodiment 6. Further, FIG. 20 is an aberration diagram of the finder system of Numerical Embodiment 6.

Each of the above numerical embodiments is constructed as one optical element, and, in order to equalize the power (refractive power) of the whole of this optical element independent of azimuths, each surface needs to satisfy the following relation as to the coefficients $C_{20}$, $C_{11}$, $C_{02}$ of surface shape proportional to curvature among the coefficients representing the shape of each reflecting surface or refracting surface:

$$C_{11}=0$$

$$C_{02}/(C_{20} \times \cos^2 \theta)=1$$

(where θ is an angle of incidence of the reference axis ray to that surface).

However, such an arrangement as to satisfy the above relation for each surface constituting the optical element would result in losing the degrees of freedom on arrangement of power of each surface.

In the numerical embodiments of the present invention, the degrees of freedom on power arrangement can be secured by setting $$C_{02}/(C_{20} \times \cos^2 \theta) \neq 1$$

for at least two surfaces constituting the optical element and also satisfying $$0 < k = \alpha/\beta \qquad \text{(Equation of condition 1)}$$

where $$\alpha = (C_{02})_1 \times (C_{02})_2 \times \ldots \times (C_{02})_n$$

$$\beta = (C_{20} \times \cos^2 \theta)_1 \times (C_{20} \times \cos^2 \theta)_2 \times \ldots \times (C_{20} \times \cos^2 \theta)_n$$

(where n is the total number of surfaces constituting the optical element and subscripts are surface numbers).

Further, k in the above equation of condition 1 is desirably set to satisfy the following condition:

$$0.1 < k < 10.0 \qquad \text{(Equation of condition 2)}.$$

By this, the power of optical system can be substantially constant independent of azimuths while securing the degrees of freedom on power arrangement.

More desirably, k in the above equation of condition 2 is set to satisfy $$0.2 < k < 5.0 \qquad \text{(Equation of condition 3)},$$

whereby the degrees of freedom on power arrangement can be secured without greatly destroying rotational symmetry of each surface.

Outside the upper and lower limits of Equation of condition 1 to 3, it will become difficult to keep the power constant independent of azimuths and destruction of symmetry of the incident beam at the respective azimuths will cause asymmetric aberration over a permissible value.

Listed below are values of $C_{02}/(C_{20} \times \cos^2 \theta)$ of each surface and values of α, β, and k for each numerical embodiment.

| Numerical Embodiment 1 | | Numerical Embodiment 2 | |
|---|---|---|---|
| Surface number | $C_{02}/(C_{20} \times \cos^2\theta)$ | Surface number | $C_{02}/(C_{20} \times \cos^2\theta)$ |
| R1 | 0.97584 | R1 | 0.79878 |

-continued

|  |  |  |  |
|---|---|---|---|
| R2 | 1.79785 | R2 | 2.31000 |
| R3 | 1.94995 | R3 | 2.58474 |
| R4 | 0.71163 | R4 | 0.60385 |
| $\alpha$ = 5.78797e-10 | | $\alpha$ = 3.45297e-9 | |
| $\beta$ = 2.37747e-10 | | $\beta$ = 1.19895e-9 | |
| k = 2.4345 | | k = 2.87999 | |

| Numerical Embodiment 3 | | Numerical Embodiment 4 | |
|---|---|---|---|
| Surface number | $C_{02}/(C_{20} \times \cos^2\theta)$ | Surface number | $C_{02}/(C_{20} \times \cos^2\theta)$ |
| R1 | 0.92781 | R1 | -0.38238 |
| R2 | 2.81745 | R2 | 1.38257 |
| R3 | 2.44273 | R3 | 1.25688 |
| R4 | 1.32619 | R4 | -1.41639 |
| $\alpha$ = 1.86856e-9 | | $\alpha$ = 3.76058e-11 | |
| $\beta$ = 2.20653e-10 | | $\beta$ = 3.99567e-11 | |
| k = 8.46832 | | k = 0.94116 | |

| Numerical Embodiment 5 | | Numerical Embodiment 6 | |
|---|---|---|---|
| Surface number | $C_{02}/(C_{20} \times \cos^2\theta)$ | Surface number | $C_{02}/(C_{20} \times \cos^2\theta)$ |
| R1 | 0.09114 | R1 | 1.06959 |
| R2 | 1.56630 | R2 | 1.05800 |
| R3 | 5.32226 | $\alpha$ = 3.07907e-6 | |
| R4 | 5.70202 | $\beta$ = 2.72093e-6 | |
| R5 | 2.70708 | k = 1.13162 | |
| R6 | 0.43122 | | |
| $\alpha$ = 8.79636e-17 | | | |
| $\beta$ = 1.73938e-17 | | | |
| k = 5.05718 | | | |

In the present specification, "nearly parallel beam" means a beam with an angle of divergence or an angle of convergence being not more than 2°.

Further, the sentence that the absolute values of powers of respective refracting surfaces are "substantially equal" means that a ratio of powers of the respective refractive surfaces is within the range of −0.8 to −1.2.

What is claimed is:

1. A reflecting optical system comprising:

a front group having a predetermined power; and a rear group having a power the sign of which is opposite to the sign of the predetermined power that said front group has;

wherein said reflecting optical system has at least one reflecting surface inclined to an object surface, wherein said front group and said rear group construct a substantially afocal optical system, and wherein at least one surface of said at least one reflecting surface comprises a rotationally asymmetric surface.

2. The reflecting optical system according to claim 1, wherein said rotationally asymmetric surface comprises a shape for correction for rotationally asymmetric aberration occurring in light passing through said reflecting optical system.

3. The reflecting optical system according to claim 1, further comprising:

a first refracting surface; and a second refracting surface, wherein said reflecting optical system is a solid optical system.

4. The reflecting optical system according to claim 3, wherein at least one of said first and second surfaces comprises a rotationally asymmetric surface.

5. The reflecting optical system according to claim 4, wherein said rotationally asymmetric surface of said first and second surfaces comprises a shape for correction for rotationally asymmetric aberration occurring in light passing through said reflecting optical system.

6. The reflecting optical system according to claim 3, wherein when each surface of said reflecting optical system is expressed by the following equation with a local coordinate system (x, y, z) with the origin at an intersecting point with a reference axis:

$$z = A/B + C_{02}y^2 + C_{11}xy + C_{20}x^2 + C_{03}y^3 + C_{12}xy^2 +$$
$$C_{21}x^2y + C_{04}y^4 + C_{13}xy^3 + C_{22}x^2y^2 + C_{31}x^3y + C_{40}x^4 + \ldots$$

where $A = (a+b) \cdot (y^2 \cdot \cos^2 t + x^2)$, $$B = 2a \cdot b \cdot \cos t[1 + \{(b-a) \cdot y \cdot \sin t/(2a \cdot b)\} +$$
$$[1 + \{(b-a) \cdot y \cdot \sin t/(a \cdot b)\} - \{y^2/(a \cdot b)\} -$$
$$\{4a \cdot b \cdot \cos^2 t + (a+b)^2 \sin^2 t\}x^2/(4a^2b^2 \cdot \cos^2 t)]^{1/2}],$$

and $a, b, C_{jk}$: constants;

$C_{jk} = 0$ for all odd $j$'s.

7. The reflecting optical system according to claim 6, wherein at least two of said each surface satisfy the following condition:

$$C_{02}/(C_{20} \times \cos^2\theta) \neq 1$$

wherein $\theta$: an angle between a normal line to each surface at said origin and said reference axis.

8. The reflecting optical system according to claim 7, wherein the following condition is satisfied:

$$\alpha/\beta > 0$$

wherein $\alpha = (C_{02})_1 \times (C_{02})_2 \times \ldots \times (C_{02})_n$, $\beta = (C_{20} \times \cos^2\theta)_1 \times (C_{20} \times \cos^2\theta)_2 \times \ldots \times (C_{20} \times \cos^2\theta)_n$, and n: the total number of surfaces forming said reflecting optical system.

9. The reflecting optical system according to claim 8, wherein the following condition is satisfied:

$$0.1 < \alpha/\beta < 10.0.$$

10. The reflecting optical system according to claim 9, wherein the following condition is satisfied:

$$0.2 < \alpha/\beta < 5.0.$$

11. The reflecting optical system according to claim 1, which is embodied in a wide converter.

12. The reflecting optical system according to claim 1, which is embodied in a tele-converter.

13. The reflecting optical system according to claim 12, further comprising:

a first refracting surface; and a second refracting surface, wherein absolute values of powers of said first refracting surface and said second refracting surface are substantially equal to each other and signs of the powers of said first and second refracting surfaces are different from each other.

14. The reflecting optical system according to claim 1, which is embodied in a finder optical system.

15. The reflecting optical system according to claim 1, wherein there exists no image forming surface in said reflecting optical system.

16. An optical apparatus comprising:
a reflecting optical system having the following groups, (a) a front group having a predetermined power, and (b) a rear group having a power the sign of which is opposite to the sign of the predetermined power that said front group has,
wherein said reflecting optical system has at least one reflecting surface inclined to an object surface,
wherein said front group and said rear group construct a substantially afocal optical system, and
wherein at least one surface of said at least one surface comprises a rotationally asymmetric surface.

17. The optical apparatus according to claim 16, wherein said rotationally asymmetric surface comprises a shape for correction for rotationally asymmetric aberration occurring in light passing through said reflecting optical system.

18. The optical apparatus according to claim 16, wherein said reflecting optical system further comprises:
a first refracting surface; and
a second refracting surface,
wherein said reflecting optical system is a solid optical system.

19. The optical apparatus according to claim 18, wherein at least one of said first and second surfaces comprises a rotationally asymmetric surface.

20. The optical apparatus according to claim 19, wherein said rotationally asymmetric surface of said first and second surfaces comprises a shape for correction for rotationally asymmetric aberration occurring in light passing through said reflecting optical system.

21. The optical apparatus according to claim 16, wherein said reflecting optical system is embodied in a finder optical system.

22. The optical apparatus according to claim 21, which is embodied as a camera.

23. The optical apparatus according to claim 16, wherein there exists no image forming surface in said reflecting optical system.

24. An optical system comprising:
a front unit having a positive power; and
a rear unit having a negative power,
wherein each of said front and rear units has a reflecting surface inclined to a reference axis,
wherein said front and rear units construct a substantially afocal optical system, and
wherein said reflecting surface comprises a rotationally asymmetric aspherical surface which has one or less symmetry plane capable of defining a pair of symmetrical surfaces.

25. An optical system comprising:
a front unit having a negative power; and
a rear unit having a positive power,
wherein each of said front and rear units has a reflecting surface inclined to a reference axis,
wherein said front and rear units construct a substantially afocal optical system, and
wherein said reflecting surface comprises a rotationally asymmetric aspherical surface which has one or less symmetry plane capable of defining a pair of symmetrical surfaces.

26. An optical system according to claims 24 or 25, wherein said reflecting surface comprises a shape for correction for rotationally asymmetric aberration occurring in light passing through said optical system.

27. An optical system according to claims 26 or 25, further comprising:
a first refracting surface; and
a second refracting surface,
wherein said optical system is a solid optical system.

28. An optical system according to claim 27, wherein at least one of said first and second surfaces comprises a rotationally asymmetric surface.

29. An optical system according to claim 28, wherein said rotationally asymmetric surface of said first and second surfaces comprises a shape for correction for rotationally asymmetric aberration occurring in light passing through said optical system.

30. An optical system according to claim 27, wherein when each surface of said optical system is expressed by the following equation with a local coordinate system (x, y, z) with the origin at an intersecting point with a reference axis:

$$z = A/B + C_{02}y^2 + C_{11}xy + C_{20}x^2 + C_{03}y^3 + C_{12}xy^2 +$$
$$C_{21}x^2y + C_{04}y^4 + C_{13}xy^3 + C_{22}x^2y^2 + C_{31}x^3y + C_{40}x^4 + \ldots$$

where $A = (a+b) \cdot (y^2 \cdot \cos^2 t + x^2)$, $B = 2a \cdot b \cdot \cos t (1 + \{(b-a) \cdot y \cdot \sin t / (2a \cdot b)\} +$
$(1 + \{(b-a) \cdot y \cdot \sin t / (a \cdot b)\} - \{y^2/(a \cdot b)\} -$
$\{4a \cdot b \cdot \cos^2 t + (a+b)^2 \sin^2 t\}x^2 / (4a^2 b^2 \cdot \cos^2 t))^{1/2})$, and $a, b, C_{jk}$: constants;

$C_{jk} = 0$ for all odd $j$'s.

31. An optical system according to claim 30, wherein at least two of said each surface satisfy the following condition:

$C_{02}/(C_{20} \times \cos^2 \theta) \neq 1$ wherein θ: an angle between a normal line to each surface at said origin and said reference axis.

32. An optical system according to claim 31, wherein the following condition is satisfied:

α/β>0 wherein $\alpha = (C_{02})_1 \times (C_{02})_2 \times \ldots \times (C_{02})_n$, $\beta = (C_{20} \times \cos^2 \theta)_1 \times (C_{20} \times \cos^2 \theta)_2 \times \ldots \times (C_{20} \times \cos^2 \theta)_n$, and n: the total number of surfaces forming said optical system.

33. An optical system according to claim 32, wherein the following condition is satisfied:

0.1<α/β<10.0.

34. An optical system according to claim 33, wherein the following condition is satisfied:

0.2<α/β<5.0.

35. An optical system according to claims 24 or 25, which is embodied in a wide converter.

36. An optical system according to claims 24 or 25, which is embodied in a tele-converter.

37. An optical system according to claim 36, further comprising:
a first refracting surface; and
a second refracting surface,
wherein absolute values of powers of said first refracting surface and said second refracting surface are substantially equal to each other and signs of the powers of said first and second refracting surfaces are different from each other.

38. An optical system according to claims 24 or 25, which is embodied in a finder optical system.

39. An imaging apparatus comprising an optical system, said optical system comprising:
a front unit having a positive power; and
a rear unit having a negative power,
wherein each of said front and rear units has a reflecting surface inclined to a reference axis,
wherein said front and rear units construct a substantially afocal optical system, and
wherein said reflecting surface comprises a rotationally asymmetric aspherical surface which has one or less symmetry plane capable of defining a pair of symmetrical surfaces.

40. An imaging apparatus comprising an optical system, said optical system comprising:
a front unit having a negative power; and
a rear unit having a positive power,
wherein each of said front and rear units has a reflecting surface inclined to a reference axis,
wherein said front and rear units construct a substantially afocal optical system, and
wherein said reflecting surface comprises a rotationally asymmetric aspherical surface which has one or less symmetry plane capable of defining a pair of symmetrical surfaces.

41. An imaging apparatus according to claims 39 or 40, wherein said reflecting surface comprises a shape for correction for rotationally asymmetric aberration occurring in light passing through said optical system.

42. An imaging apparatus according to claims 39 or 40, further comprising:
a first refracting surface; and
a second refracting surface,
wherein said optical system is a solid optical system.

43. An imaging apparatus according to claim 42, wherein at least one of said first and second surfaces comprises a rotationally asymmetric surface.

44. An imaging apparatus according to claim 43, wherein said rotationally asymmetric surface of said first and second surfaces comprises a shape for correction for rotationally asymmetric aberration occurring in light passing through said optical system.

45. An imaging apparatus according to claim 42, wherein when each surface of said optical system is expressed by the following equation with a local coordinate system (x, y, z) with the origin at an intersecting point with a reference axis:

$$z = A/B + C_{02}y^2 + C_{11}xy + C_{20}x^2 + C_{03}y^3 + C_{12}xy^2 +$$
$$C_{21}x^2y + C_{04}y^4 + C_{13}xy^3 + C_{22}x^2y^2 + C_{31}x^3y + C_{40}x^4 + \ldots$$

where $A = (a+b) \cdot (y^2 \cdot \cos^2 t + x^2)$, $B = 2a \cdot b \cdot \cos t (1 + \{(b-a) \cdot y \cdot \sin t / (2a \cdot b)\} +$
$(1 + \{(b-a) \cdot y \cdot \sin t / (a \cdot b)\} - \{y^2/(a \cdot b)\} -$
$\{4a \cdot b \cdot \cos^2 t + (a+b)^2 \sin^2 t\} x^2 / (4a^2 b^2 \cdot \cos^2 t))^{1/2})$, and $a, b, C_{jk}$: constants;

$C_{jk} = 0$ for all odd $j$'s.

46. An imaging apparatus according to claim 45, wherein at least two of said each surface satisfy the following condition:

$C_{02}/(C_{20} \times \cos^2 \theta) \neq 1$ wherein θ: an angle between a normal line to each surface at said origin and said reference axis.

47. An imaging apparatus according to claim 46, wherein the following condition is satisfied:

$\alpha/\beta > 0$ wherein $\alpha = (C_{02})_1 \times (C_{02})_2 \times \ldots \times (C_{02})_n$, $\beta = (C_{20} \times \cos^2 \theta)_1 \times (C_{20} \times \cos^2 \theta)_2 \times \ldots \times (C_{20} \times \cos^2 \theta)_n$, and n: the total number of surfaces forming said optical system.

48. An imaging apparatus according to claim 47, wherein the following condition is satisfied:

$0.1 < \alpha/\beta < 10.0$.

49. An imaging apparatus according to claim 48, wherein the following condition is satisfied:

$0.2 < \alpha/\beta < 5.0$.

50. An imaging apparatus according to claims 39 or 40, which is embodied in a wide converter.

51. An imaging apparatus according to claims 39 or 40, which is embodied in a tele-converter.

52. An imaging apparatus according to claim 51, further comprising:
a first refracting surface; and
a second refracting surface,
wherein absolute values of powers of said first refracting surface and said second refracting surface are substantially equal to each other and signs of the powers of said first and second refracting surfaces are different from each other.

53. An imaging apparatus according to claims 39 or 40, which is embodied in a finder optical system.

* * * * *

UNITED STATES PATENT AND TRADEMARK OFFICE
CERTIFICATE OF CORRECTION

PATENT NO.   : 5,973,858
DATED        : October 26, 1999
INVENTOR(S)  : Sekita

It is certified that error appears in the above-identified patent and that said Letters Patent is hereby corrected as shown below:

Column 1,
Line 33, "called as an" should read -- called an --

Column 4,
Line 31, "oficidence" should read -- of incidence -- and "combinationof" should read -- combination of --.
Line 33, "$u_y,$ " should read -- ($u_y,$ --.

Column 5,
Line 11, "as a reference" should read -- a reference --.
Line 63, "as" should be deleted.
Line 64, "after " should read -- after being --.
Line 65, "surface as" should read -- surface, --.
Line 67, "as" should be deleted.

Column 6,
Line 2, "surface as" should read -- surface, --.
Line 9, "making 90°" should read -- oriented 90° --.

Column 7,
Equation 1, "(cos θ' sin ξ ' sin ξ+" should read -- ((cos θ' sin ξ ' sin ξ+ --.

Column 8,
Line 62, --Eq. 4) -- should be inserted adjacent the equation in column 7, lines 62 and 63.

Column 17,
Line 14, "13.50" should read -- 13.5° --.
Line 43, "0.322" should read -- -10.322 --.

Column 18,
Line 44, "$C_{O3}=6.16435c-05$ $C_{21}=1.75793c-04$" should read
-- $C_{O3}=6.16435e-05$ $C_{21}=1.75793e-04$ --.
Line 47, "$C_{O2}=81460c-03$ $C_{20}=1.86118c-03$" should read
-- $C_{O2}-1.81460e-03$ $C_{20}=1.86118e-03$ --.

Column 19,
Line 43, "9      -7.00    14.70    0.00    4.00    1        refracting"
should read
         --9     -7.00    14.70    0.00    1.00    1        refracting --.

UNITED STATES PATENT AND TRADEMARK OFFICE
CERTIFICATE OF CORRECTION

PATENT NO.    : 5,973,858                                       Page 2 of 3
DATED         : October 26, 1999
INVENTOR(S)   : Sekita It is certified that error appears in the above-identified patent and that said Letters Patent is hereby corrected as shown below:

Column 18,
Line 44, "$C_{03}$=6.16435c-05 $C_{21}$=1.75793c-04" should read
-- $C_{O3}$=6.16435e-05$C_{21}$=1.75793e-04 --.
Line 47, "$C_{02}$=1.81460c-03 $C_{20}$=1.86118c-03" should read
-- $C_{02}$=1.81460e-03 $C_{20}$=1.86118E-03 --.

Column 19,
Line 43, "9    -7.00   14.70   0.00   4.00   1        refracting" should read
       --9    -7.00   14.70   0.00   1.00   1        refracting --
Line 64, "R13 surface $R_{13}$= '37.578: should read
--R13 surface $R_{13}$ = -37.578 --.

Column 20,
Line 41, "embodiment, Power." should read -- embodiment, the power --.

Column 21,
Line 45, "$C_{22}$=-9.44552c-06" should read -- $C_{22}$=-99.44552e-06 --.
Line 48, "$C_{02}$=-2.89686c-03" shoul read -- $C_{02}$=-2.89686e-03 --.

Column 23,
Line 11, "$C_{04}$=-1.11036c-06" should read -- $C_{22}$=-9.44552e-06 --.

Column 24,
Line 11, "$C_{40}$=1.80498c-06" should read -- $C_{40}$=1.80498e-06 --.
Line 17, "$C_{20}$=2.02727c-03" should read -- $C_{20}$=1.02727e-06 --.
Line 38, "$C_{02}$=1.12745c-03" should read -- $C_{02}$=1.12745e-03 --.

Column 25,
Line 33, "Zi 0i" should read -- Zi $\theta$i --.
Line 43,"$C_{04}$=4.47276c-08" should read -- $C_{04}$=4.47276e-08 --.
Line 61, R1 -0.00047" should read -R1 -0.00924 --.

UNITED STATES PATENT AND TRADEMARK OFFICE
CERTIFICATE OF CORRECTION

PATENT NO.     : 5,973,858
DATED          : October 26, 1999
INVENTOR(S)    : Sekita It is certified that error appears in the above-identified patent and that said Letters Patent is hereby corrected as shown below:

<u>Column 30,</u>
Line 5, "claims 26" should -- claim 24 --.

Signed and Sealed this

Twentieth Day of November, 2001

Attest:

*Attesting Officer*

NICHOLAS P. GODICI
*Acting Director of the United States Patent and Trademark Office*